(12) United States Patent
Kase

(10) Patent No.: US 10,569,460 B2
(45) Date of Patent: Feb. 25, 2020

(54) MOLDING HEAD MOUNTED ON DISCHARGE CONTAINER

(71) Applicant: YOSHINO KOGYOSHO CO., LTD., Tokyo (JP)

(72) Inventor: Mai Kase, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 280 days.

(21) Appl. No.: 15/386,758

(22) Filed: Dec. 21, 2016

(65) Prior Publication Data

US 2017/0182699 A1 Jun. 29, 2017

(30) Foreign Application Priority Data

Dec. 25, 2015 (JP) ................................. 2015-254855

(51) Int. Cl.

| B29C 48/21 | (2019.01) |
|---|---|
| B29C 48/285 | (2019.01) |
| B29C 48/12 | (2019.01) |
| B29C 48/255 | (2019.01) |
| B29C 48/025 | (2019.01) |
| B29C 48/30 | (2019.01) |
| B29C 48/25 | (2019.01) |

(Continued)

(52) U.S. Cl.

CPC ............ B29C 48/285 (2019.02); B29C 48/12 (2019.02); B29C 48/21 (2019.02); B29C 48/2552 (2019.02); B29C 48/025 (2019.02); B29C 48/266 (2019.02); B29C 48/2694 (2019.02); B29C 48/30 (2019.02); B29C 48/345 (2019.02); B29L 2031/7022 (2013.01)

(58) Field of Classification Search

CPC ................... B29C 47/08; B29C 47/083; B29L 2031/7142

See application file for complete search history.

(56) References Cited

U.S. PATENT DOCUMENTS

| 3,790,331 A * | 2/1974 | Backer ................. A23G 3/0242 264/245 |
|---|---|---|
| 4,341,348 A | 7/1982 | Dearling |
| 5,813,785 A * | 9/1998 | Baudin ................ B65D 83/285 401/190 |

FOREIGN PATENT DOCUMENTS

| GB | 1170341 A | 11/1969 |
|---|---|---|
| GB | 2 220 989 A | 1/1990 |

(Continued)

OTHER PUBLICATIONS

Dec. 12, 2017 Office Action issued in Japanese Patent Application No. 2014-133923.

(Continued)

*Primary Examiner* — Jacob T Minskey

(57) ABSTRACT

The present invention is a molding head that includes: a mounting part mounted around a discharge hole of a discharge container; and a molding part having a plurality of forming holes through which a discharge discharged from the discharge hole separately passes and a molding surface to which the plurality of forming holes are open, and configured to combine a plurality of molded pieces, which are formed by the discharge molded by separately passing through the plurality of forming holes, on the molding surface to form a molding. A diffusion chamber, in which the discharge is diffused in a radial direction along the molding surface and is fed to the plurality of forming holes, is configured to be provided.

38 Claims, 20 Drawing Sheets

(51) Int. Cl.
  *B29C 48/345* (2019.01)
  *B29L 31/00* (2006.01)

(56) References Cited

FOREIGN PATENT DOCUMENTS

| JP | S59-16385 U | | 1/1984 |
|---|---|---|---|
| JP | S60-116433 A | | 6/1985 |
| JP | S61-55959 U | | 4/1986 |
| JP | S62-160158 A | | 7/1987 |
| JP | H01-103554 U | | 7/1989 |
| JP | 2000-327055 A | * | 11/2000 |
| JP | 2000-327055 A | | 11/2000 |
| JP | 2002-080080 A | | 3/2002 |
| JP | 2002-320885 A | | 11/2002 |
| JP | 2006-290408 A | | 10/2006 |
| JP | 2010-269233 A | | 12/2010 |
| JP | 2013-241203 A | | 12/2013 |
| JP | 2013-256316 A | | 12/2013 |
| JP | 2014-009004 A | | 1/2014 |
| JP | 2014-009004 A | * | 1/2014 |
| JP | 2016-050002 A | | 4/2016 |

OTHER PUBLICATIONS

Dec. 19, 2017 Office Action issued in Japanese Patent Application No. 2014-176117.
Feb. 7, 2017 Search Report issued in International Patent Application No. PCT/JP2016/088423.
Mar. 26, 2019 Office Action issued in Japanese Patent Application No. 2015-130079.
Jul. 22, 2019 Extended Search Report issued in European Patent Application No. 16878936.0.
Nov. 13, 2018 Office Action issued in Japanese Patent Application No. 2015-130079.

* cited by examiner

MOLDING HEAD MOUNTED ON DISCHARGE CONTAINER

CROSS-REFERENCES TO RELATED APPLICATIONS

This application incorporates the contents of Japanese Patent Application No. 2015-254855, filed on Dec. 25, 2015, and claims the priority thereof.

BACKGROUND OF THE INVENTION

Field of the Invention

The present invention relates to a molding head mounted on a discharge container.

Description of Related Art

So far a discharge container disclosed, for instance, in Japanese Unexamined Patent Application, First Publication No. 2014-9004 has been known. In this discharge container, for example, a part to be coated is coated with a foam-like discharge discharged from a discharge hole to a brush via the brush.

Here, the inventor of this application found that the discharge discharged from the discharge hole was molded into a molding formed in a desired three-dimensional shape on the discharge container before the discharge was fed to a position away from the discharge container, for example the part to be coated. In this way, the discharge is molded into the molding, and thereby, for example, an improvement in added value of the discharge container is expected.

So far a discharge container disclosed, for instance, in Japanese Unexamined Utility Model Application, First Publication No. H01-103554 has been known. This discharge container is provided with a pan in which a liquid pumped up above an internal piston is accumulated. The pan is provided with a communication hole communicating with the internal piston and a backup plate located above the communication hole. The backup plate is coupled to an edge of the communication hole via a plurality of stationary legs that are arranged in a circumferential direction of the communication hole at intervals. The plurality of stationary legs form a plurality of liquid discharge holes that discharge the liquid pumped up above the internal piston to an upper surface (a discharge surface) of the pan.

However, in the conventional discharge container, the plurality of liquid discharge holes are divided in a circumferential direction by the stationary legs. Thereby, after the content is discharged from the communication holes and separately flows through the plurality of liquid discharge holes, a variation in amount of discharge of the content discharged to the upper surface of the pan easily occurs at each position in a circumferential direction. When the amount of discharge of the content discharged to the upper surface of the pan varies at each position in a circumferential direction, there is a possibility that, for example, a discharge speed of the content may increase locally at a part in the circumferential direction and the content may overflow unintentionally from the pan.

So far a discharge container disclosed, for instance, in Japanese Unexamined Utility Model Application, First Publication No. H01-103554 has been known. This discharge container is provided with a pan in which a liquid (a content) pumped up above an internal piston is accumulated. The pan is provided with a communication hole communicating with the internal piston and a backup plate located above the communication hole. The backup plate is coupled to a periphery of the communication hole via a plurality of stationary legs that are arranged in a circumferential direction of the communication hole at intervals. Liquid discharge holes that discharge the liquid pumped up above the internal piston to an upper surface (a discharge surface) of the pan are formed between the stationary legs adjacent to each other in the circumferential direction.

However, in the conventional discharge container, when the content is discharged, the pan to which the content is discharged is squeezed downwards. Thereby, there is a possibility that the content may stick to a hand, the pan may vary from the internal piston, and the content discharged to the pan may overflow.

The present invention was conceived in view of the aforementioned circumstances, and an object thereof is to form a molding with high accuracy.

SUMMARY OF THE INVENTION

To resolve the problems, the present invention proposes the following means. A first aspect of the present invention is a molding head including: a mounting part mounted around a discharge hole of a discharge container; and a molding part having a plurality of forming holes through which a discharge discharged from the discharge hole separately passes and a molding surface to which the plurality of forming holes are open, and configured to combine a plurality of molded pieces, which are formed by the discharge molded by separately passing through the plurality of forming holes, on the molding surface to form a molding. In the molding head, a diffusion chamber, in which the discharge discharged from the discharge hole is diffused in a radial direction along the molding surface and is fed to the plurality of forming holes, is provided between the mounting part and the molding part.

In this case, the discharge discharged from the discharge hole of the discharge container is formed by separately being passed through the plurality of forming holes, and thereby the plurality of molded pieces are formed. These molded pieces are combined on the molding surface, and thereby the molding is formed. Here, the diffusion chamber is provided between the mounting part and the molding part. For this reason, the discharge can be fed to each of the forming holes such that the discharge is inhibited from being concentrated on and fed to specific some of the plurality of forming holes and a variation in an amount of feed of the discharge to each of the forming holes is reduced. Thereby, the discharge can be inhibited from being too much or little fed to the forming holes, a proper amount of discharge can be fed to each of the forming holes. Therefore, the molded pieces formed by the forming holes can be accurately formed, and the molding can be formed with high accuracy.

A second aspect of the present invention is a molding head including: a mounting part mounted around a discharge hole of a discharge container; and a molding part having a plurality of forming holes through which a discharge discharged from the discharge hole separately passes and a molding surface to which the plurality of forming holes are open, and configured to combine a plurality of molded pieces, which are formed by the discharge molded by separately passing through the plurality of forming holes, on the molding surface to form a molding. In the molding head, a diffusion chamber, in which the discharge discharged from the discharge hole is diffused in a radial direction along the molding surface and is fed to the plurality of forming holes, is configured to be provided between the mounting part and the molding part. The molding part has a main body part which is disposed above a stem that is vertically provided in a mouth of the discharge container to be movable down in an upwardly biased state and through which the forming holes pass in a vertical direction. The mounting part is provided, between an upper standby position at which the mounting part is in contact with or close to a feeding surface that is directed downwards at the main body part and a lower discharge position at which the mounting part is separated downwards from the feeding surface and the diffusion chamber is formed between the mounting part and the molding part, to be movable up and down in the molding part. The mounting part is provided with a locking part that is locked to the stem when located at the discharge position and lowers the stem along with downward movement of the mounting part.

In this case, when this molding head is used, the mounting part is lowered up to the discharge position from a state in which it is located at the standby position. The diffusion chamber is formed between the molding part and the mounting part, and the locking part of the mounting part is locked to the stem. When the mounting part is lowered again, the locking part lowers the stem against an upward biasing force along with the downward movement of the mounting part, and the content inside the discharge container is fed to the diffusion chamber through the stem. Then, after the content is diffused in the diffusion chamber in the radial direction, the content is fed to the forming holes, and is discharged from the discharge hole to the molding surface. Afterwards, the mounting part is raised to restore and displace the stem in an upward direction, and the mounting part is restored and displaced to the standby position. At this point, since the mounting part is in contact with or close to the feeding surface, although the content remains in the diffusion chamber before the mounting part is raised, this content is extruded from the diffusion chamber to the outside. According to this molding head, since the content inside the discharge container is diffused in the diffusion chamber in the radial direction and then is fed to the forming holes, the content can be fed to the forming holes such that the content is inhibited from being concentrated on the forming holes disposed at a specific portion of the molding surface and a variation in an amount of feed of the content to each of the forming holes is reduced. Thereby, a variation in an amount of discharge of the content discharged to the molding surface can be inhibited at each position. The mounting part is restored and replaced to the standby position, and thereby the content remaining in the diffusion chamber can be extruded from the diffusion chamber. For this reason, a remaining amount of the content in the molding part can be reduced. In this way, the remaining amount of the content in the molding part is reduced. Thereby, for example, the inside of the molding part can also be easy to cleanly maintain.

A third aspect of the present invention is the molding head of the first aspect or the second aspect in which the discharge hole is provided inside the stem that is erected in a mouth of the discharge container to be movable down in an upwardly biased state; and the mounting part is mounted around the discharge hole via the stem.

In this case, the mounting part is mounted around the discharge hole via the stem. Thereby, the mounting part is lowered, and thereby the stem can be lowered to discharge the discharge from the discharge hole. The discharge can be easily discharged.

A fourth aspect of the present invention is the molding head of the first aspect or the second aspect in which the molding part has a main body part which is disposed above a stem that is erected in a mouth of the discharge container to be movable down in an upwardly biased state and through which the forming holes pass in a vertical direction; the mounting part is movably provided inside the molding part; the molding part is mounted on the discharge container; the mounting part is provided with a locking part that is locked to the stem and lowers the stem along with downward movement of the mounting part, and depressing parts that protrude toward an outside in the radial direction; and the depressing parts are arranged outside the molding part via an insertion hole formed in a circumferential wall of the molding part.

In this case, the depressing parts depressed when the content is discharged are provided with the mounting part independently of the molding part having the molding surface to which the content is discharged. For this reason, the content can be discharged without contact with the molding surface of the molding part, and the content can be prevented from sticking to hands. The molding part is inhibited from wobbling, and the content can be prevented from overflowing from the molding surface.

A fifth aspect of the present invention is the molding head of the fourth aspect in which the mounting part is provided with a pot main body disposed in the molding part; and the depressing parts are each provided with a lateral plate whose inner and outer surfaces extend along an outer circumferential surface of the molding part, a depressing plate which protrudes from the lateral plate toward the outside in the radial direction and whose top and bottom surfaces are directed in a vertical direction, and a connecting plate that connects the lateral plate and the pot main body and is inserted into the insertion hole.

In this case, the depressing parts are provided with the lateral plates that extend along the outer circumferential surface of the molding part, and the depressing plates protruding toward the outside in the radial direction are connected to the connecting plates via the lateral plates. For this reason, bending rigidity of the overall depressing parts in the vertical direction can be easily secured, and durability can be improved.

A sixth aspect of the present invention is the molding head of the third aspect in which the mounting part is mounted on the stem to be rotatable around an axis of the stem and is lowered along with rotational movement relative to the stem.

In this case, the mounting part is lowered along with the rotational movement relative to the stem. For this reason, the mounting part can be lowered together with the stem by rotating the mounting part relative to the stem. Thereby, for example, in comparison with when the mounting part is depressed and lowered, an amount of movement or a moving speed when the mounting part moves down can be easily stabilized. Therefore, an amount of discharge or a discharge speed of the discharge discharged from the forming holes can be stabilized. As a result, the discharge can be effectively diffused in the diffusion chamber.

A seventh aspect of the present invention is the molding head of the sixth aspect which further includes a conversion mechanism configured to convert the rotational movement of the mounting part relative to the stem into downward movement of the mounting part relative to the mouth, and in which the conversion mechanism alternately repeats a descent state in which the mounting part is lowered against an upward biasing force of the stem and an ascent state in which the mounting part is raised by the biasing force of the stem when the mounting part is rotated around the axis in the same direction.

In this case, when the mounting part is rotated around the axis in the same direction, the conversion mechanism alternately repeats the descent state and the ascent state. For this reason, for example, the mounting part can be inhibited from being excessively lowered along with the rotational movement of the mounting part. Thereby, the discharge can be more effectively diffused in the diffusion chamber.

An eighth aspect of the present invention is the molding head of any one of the first, second, third, sixth, and seventh aspects in which a restraint member facing the discharge hole is provided for the diffusion chamber.

In this case, since the restraint member is provided with the diffusion chamber, the straight movement of the discharge discharged from the forming holes can be restrained by the restraint member. Thereby, the discharge can be effectively diffused in the diffusion chamber.

A ninth aspect of the present invention is the molding head of any one of the first, second, third, and sixth to eighth aspects in which at least some of the plurality of forming holes serve as forming elongate holes formed in an elongate hole shape; and oblique elongate holes, in which one of a pair of sidewall surfaces extending in a direction in which each of the forming elongate holes extends in wall surfaces defining the forming elongate holes, is inclined to be separated from the other sidewall surface as the one approaches the molding surface, are provided as the forming elongate holes.

In this case, among the plurality of molded pieces, the molded pieces molded by the forming elongate holes are formed to have elongate shapes in directions in which the forming elongate holes extend. Here, in the oblique elongate holes, one of the sidewall surfaces is inclined as described above. For this reason, among the plurality of molded pieces, the molded pieces molded by the oblique elongate holes can be erected while being inclined in a direction in which one of the sidewall surfaces is inclined without being erected upright on the molding surface. Therefore, the molded pieces molded by the forming elongate holes can be erected while being inclined in a desired direction according to the shape of the molding, and the molding can be formed with high accuracy.

A tenth aspect of the present invention is the molding head of any one of the first, second, third, and sixth to ninth aspects in which a dimension of the diffusion chamber in a direction along a head axis perpendicular to the molding surface is equal to or greater than 1.5 mm.

In this case, the dimension of the diffusion chamber in the direction along the head axis perpendicular to the molding surface is equal to or greater than 1.5 mm. For this reason, a sufficient dimension (a height) of the diffusion chamber in the direction along the head axis perpendicular to the molding surface can be sufficiently secured. Thereby, the discharge can be effectively diffused in the radial direction. For example, the discharge is also passed through the forming holes located on the outermost side in the radial direction among the plurality of forming holes, and the molded pieces can be easily molded.

An eleventh aspect of the present invention is the molding head of any one of the first, second, third, and sixth to tenth aspects in which at least some of the plurality of forming holes serve as forming elongate holes formed in an elongate hole shape; and the plurality of forming elongate holes are disposed in the radial direction at intervals.

In this case, the plurality of forming elongate holes are disposed in the radial direction at intervals. For this reason, the molded pieces such as petals can be multiply disposed on the molding surface in the radial direction. Thereby, a double flower such as a rose can be easily molded with high accuracy.

A twelfth aspect of the present invention is the molding head of the eleventh aspect in which widths of lower end openings of the forming elongate holes located on an innermost side in the radial direction among the plurality of forming elongate holes are less than 2 mm.

In this case, the widths of the lower end openings of the forming elongate holes located on the innermost side in the radial direction among the plurality of forming elongate holes are less than 2 mm. That is, these widths can be kept narrow. Therefore, when the discharge is discharged from the forming holes on the inside in the radial direction, the discharge inside the diffusion chamber can be inhibited from passing through the forming elongate holes located on the innermost side in the radial direction among the plurality of forming elongate holes. Thereby, the discharge can be easy to effectively diffuse in the diffusion chamber toward the outside in the radial direction.

A thirteenth aspect of the present invention is the molding head of the eleventh or twelfth aspect in which a radial interval between the forming elongate holes adjacent to each other in the radial direction is less than 5 mm.

In this case, since the radial interval between the forming elongate holes adjacent to each other in the radial direction is less than 5 mm, the forming elongate holes can be moderately closed up each other. Thereby, the molded pieces can be inhibited from being excessively separated on the molding surface, and the plurality of molded pieces can be easily accurately combined on the molding surface.

A fourteenth aspect of the present invention is the molding head of the ninth aspect in which the forming elongate holes extend in a circumferential direction that circles around a head axis perpendicular to the molding surface.

In this case, the forming elongate holes extend in the circumferential direction. For this reason, for example, the molded pieces, each of which is similar to a piece of petal, can be formed on the molding surface by the forming elongate holes.

A fifteenth aspect of the present invention is the molding head of the fourteenth aspect in which the plurality of forming elongate holes are disposed in the circumferential direction at intervals.

In this case, since the plurality of forming elongate holes are disposed in the circumferential direction at intervals, the plurality of molded pieces like petals can be arranged on the molding surface in the circumferential direction side by side. Thereby, for example, an ornamental crown can be easily accurately molded by all of these plurality of molded pieces.

A sixteenth aspect of the present invention is the molding head of the fourteenth aspect in which, as the oblique elongate holes, outer oblique elongate holes, in each of which one of the pair of sidewall surfaces located on the outside in the radial direction is inclined, are provided; and some of the plurality of forming elongate holes which are located on the outermost side in the radial direction are the outer oblique elongate holes.

In this case, among the plurality of forming elongate holes, those located on the outermost side in the radial direction are the outer oblique elongate holes. For this reason, the molded pieces formed on the molding surface at portions located on the outside in the radial direction by the forming elongate holes can be erected while being inclined on the outside in the radial direction. Thereby, for example, the molded pieces equivalent to petals located on an outer circumference of a double flower can be directed to the outside in the radial direction, and the molding such as a flower can be accurately molded.

A seventeenth aspect of the present invention is the molding head of the second aspect in which a biasing member that upwardly biases the mounting part located at the discharge position and raises the mounting part up to the standby position is provided between the discharge container and the mounting part.

In this case, the biasing member is provided between the discharge container and the mounting part. For this reason, the mounting part located at the discharge position can be raised up to the standby position on the basis of the upward biasing force of the biasing member. Thereby, handleability of this discharge container can be improved.

An eighteenth aspect of the present invention is the molding head of the second or seventeenth aspect in which the mounting part is provided with a pot main body which is fitted into the molding part and whose outer periphery slides on an inner circumferential surface of the molding part in a vertical direction.

In this case, the mounting part is provided with the pot main body. For this reason, the content inside the diffusion chamber can be inhibited from leaking between an outer periphery of the pot main body and inner circumferential surface of the molding part without intention.

A nineteenth aspect of the present invention is the molding head of the eighteenth aspect in which the pot main body is formed with a communication hole that communicates with an inside of the stem and the diffusion chamber when the mounting part is located at the discharge position; and the locking part is formed by an open periphery of the communication hole at the pot main body.

In this case, since the locking part is formed by the open periphery of the communication hole at the pot main body, a structure of the mounting part can be simplified.

A twentieth aspect of the present invention is the molding head of the eighteenth or nineteenth aspect in which the mounting part is provided with a guide tube that extends downwards from the pot main body and is inserted into the stem.

In this case, the mounting part is provided with the guide tube. For this reason, vertical movement of the mounting part can be guided by the stem and the guide tube, and handleability of this discharge container can be improved.

According to the present invention, a molding can be formed with high accurary.

Figure 1:
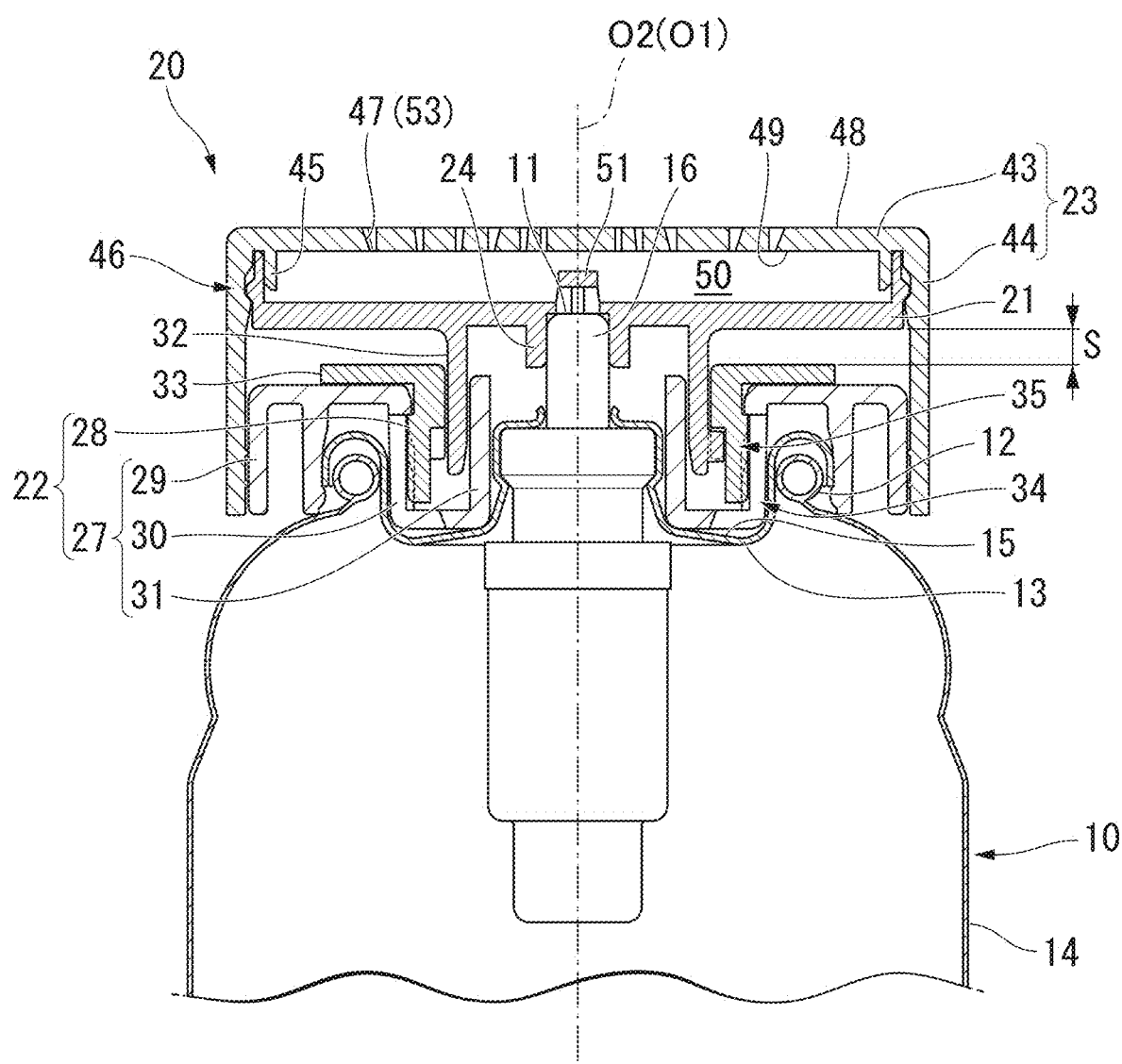
FIG. 1 is a longitudinal sectional view of a molding head according to a first embodiment of the present invention.

DETAILED DESCRIPTION OF THE INVENTION (First Embodiment)

Hereinafter, a molding head according to a first embodiment of the present invention will be described with reference to FIGS. 1 to 9.

As illustrated in FIGS. 1 to 9, a molding head 20 is attached to a discharge container 10. The discharge container 10 discharges a self-supportable discharge M at least for a certain period of time after discharge of, for example, a foam or a high-viscosity material from a discharge hole 11. In the present embodiment, the discharge container 10 is formed in a bottomed tubular shape, and has a sealed container shape as a mouth 12 of this discharge container 10 is covered with a top wall 13. In the illustrated example, as the discharge container 10, an aerosol can in which a liquid content is contained is adopted.

All the center axes of the mouth 12, base 14, and a bottom (not shown) of the discharge container 10 are disposed on a common container axis O1. The top wall 13 is provided with an annular concavity 15 that extends in a direction in which it circles around the container axis O1 (or a head axis O2). The annular concavity 15 is recessed downwards.

A stem 16 is vertically provided for the mouth 12 of the discharge container 10. The stem 16 is vertically provided for the mouth 12 to be movable downwards in an upwardly biased state. The stem 16 is disposed coaxially with the container axis O1, and is formed with a smaller diameter than that of the annular concavity 15. The stem 16 passes through the top wall 13. The discharge hole 11 is provided inside an upper end of the stem 16 which is located outside the discharge container 10, and a discharge valve (not shown) is provided at a portion of the stem 16 which is located inside the discharge container 10.

When the stem 16 is pushed down with respect to the discharge container 10, the discharge valve is opened, and a content inside the discharge container 10 is discharged from the discharge hole 11 through the inside of the stem 16. The internal content of the discharge container 10 which is formed of a foam is discharged from the discharge hole 11 as the discharge M. When the depression of the stem 16 is released, the stem 16 is raised by an upward biasing force acting on the stem 16 and the discharge valve is closed, so that the discharging of the discharge M is stopped.

Figure 2:
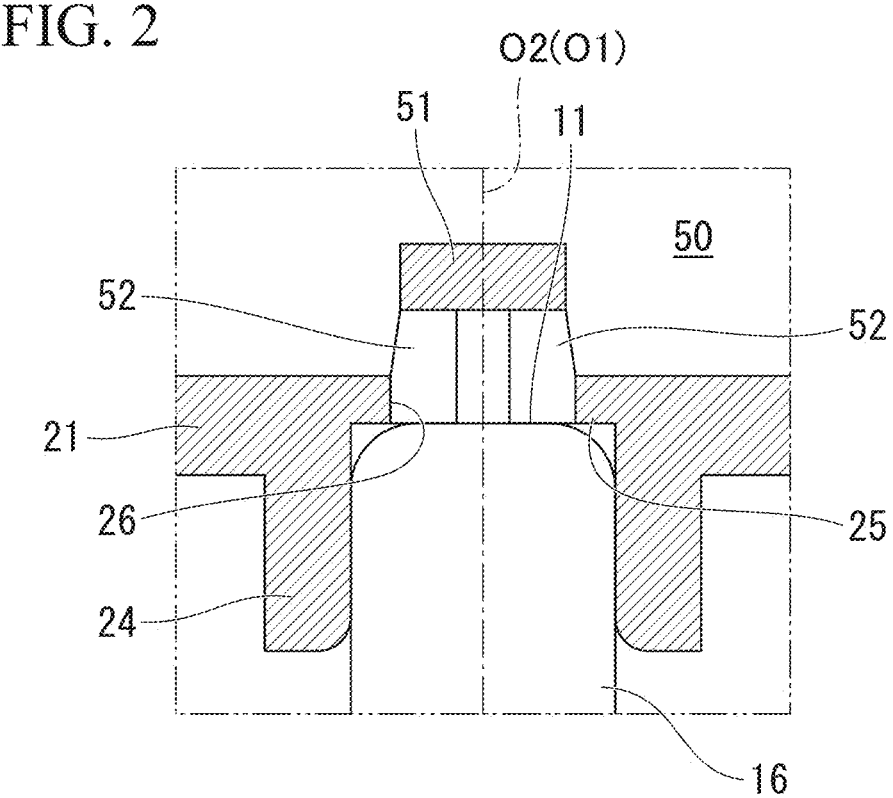
FIG. 2 is an enlarged longitudinal sectional view of a main part of the molding head illustrated in FIG. 1.
Figure 3:
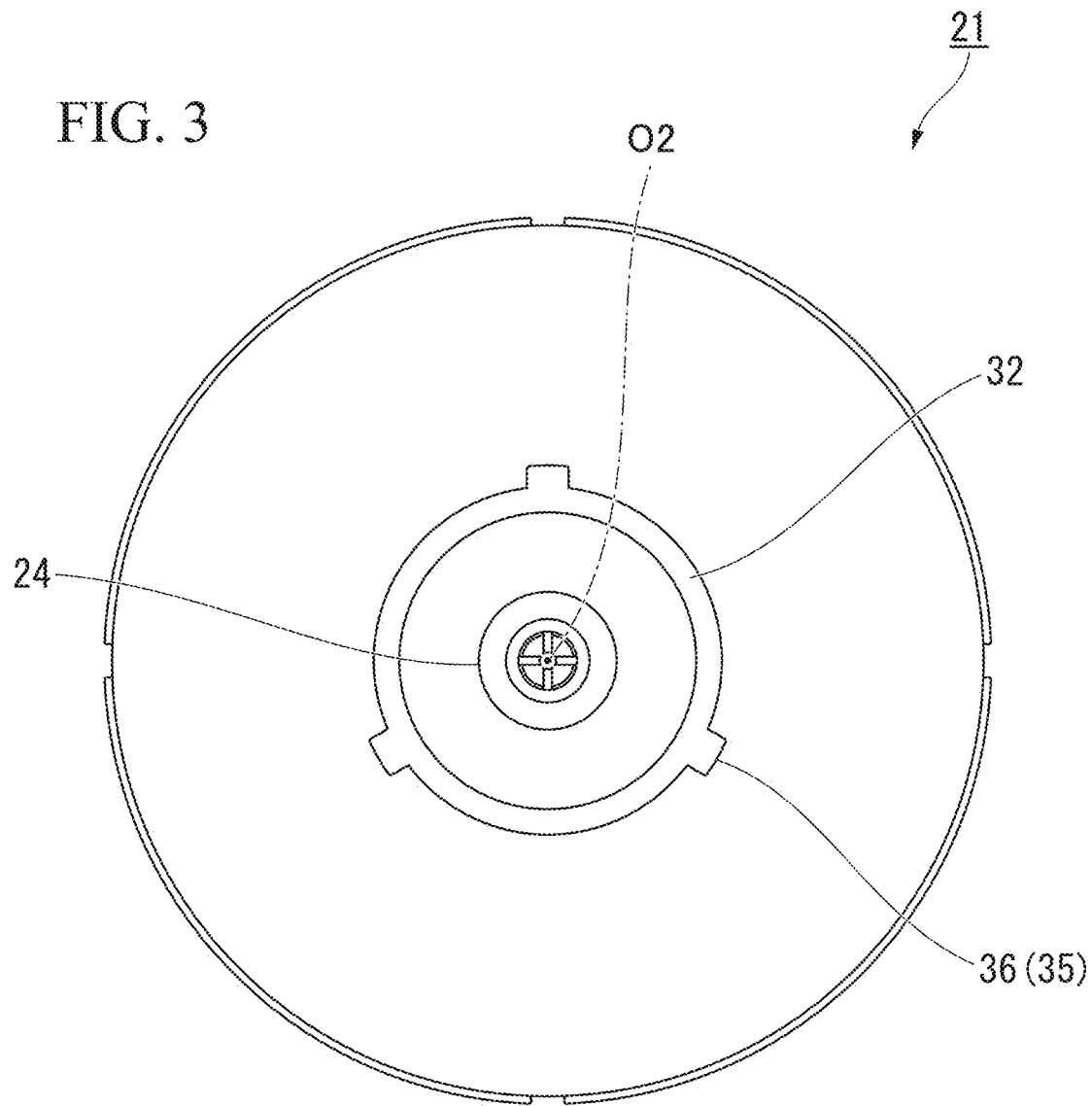
FIG. 3 is a bottom view of a mounting part constituting the molding head illustrated in FIG. 1.
Figure 4:
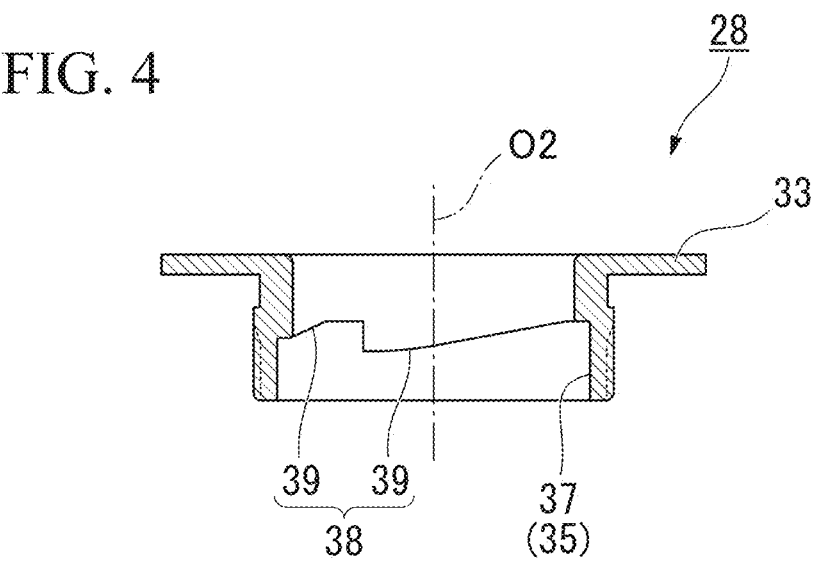
FIG. 4 is a longitudinal sectional view of a ratchet part constituting the molding head illustrated in FIG. 1.
Figure 5:
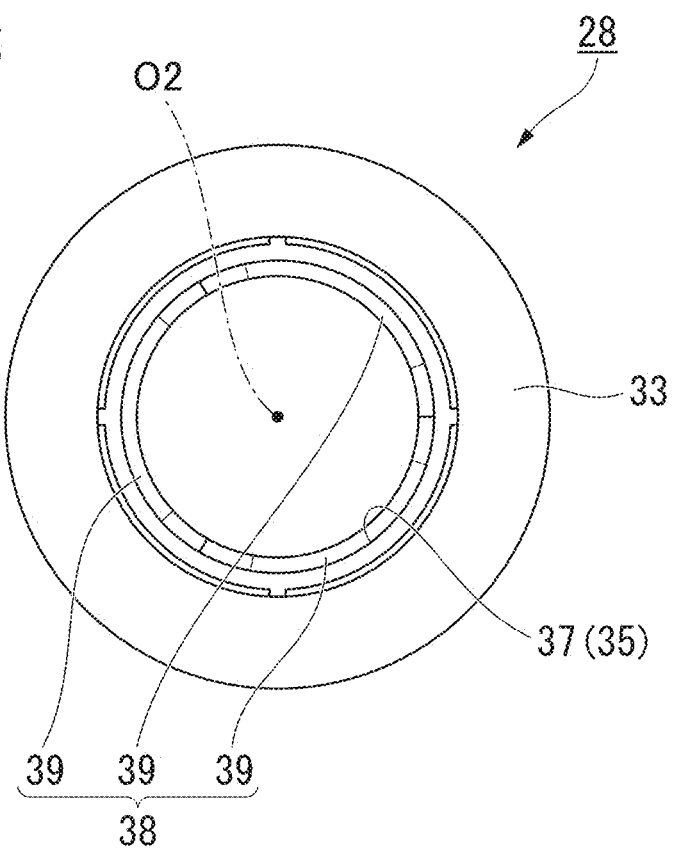
FIG. 5 is a bottom view of the ratchet part constituting the molding head illustrated in FIG. 1.
Figure 9:
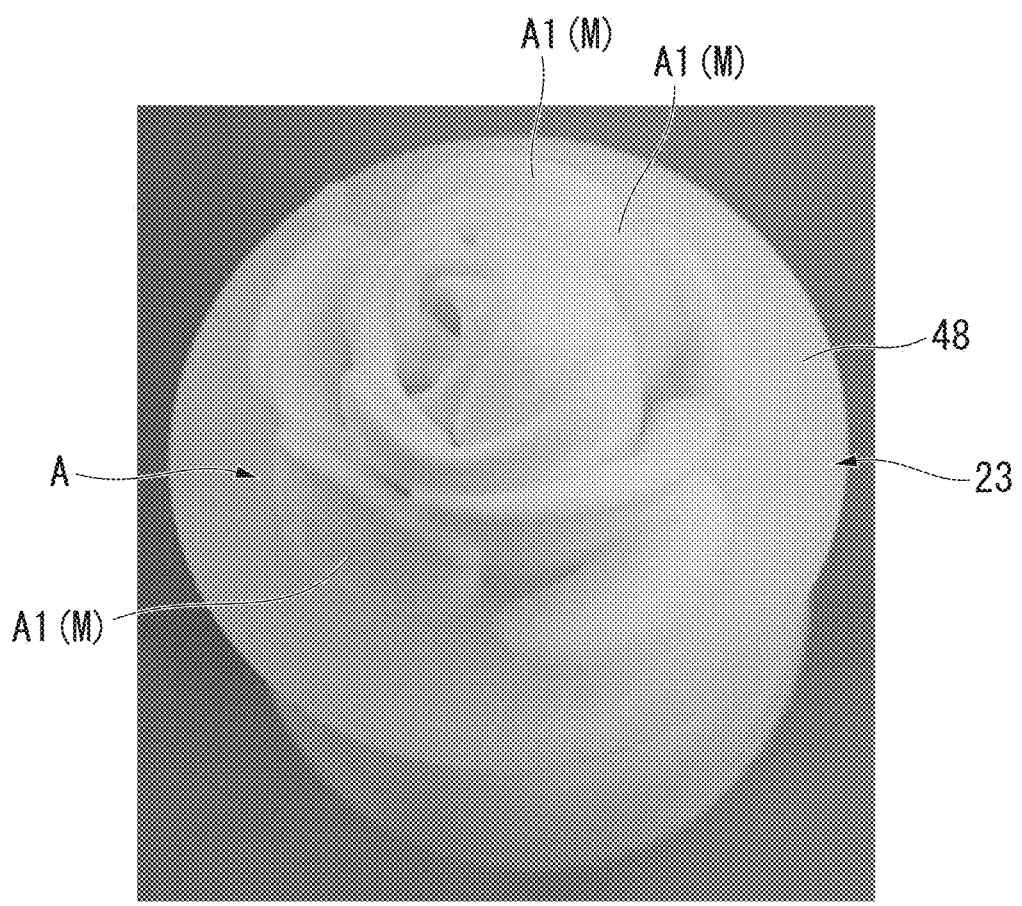
FIG. 9 is a photograph of a molding molded by the molding head illustrated in FIG. 1.

The molding head 20 forms the discharge M discharged from the discharge hole 11 of the discharge container 10 in a shape that differs from a case in when the discharge M is simply discharged from the discharge hole 11, and molds a molding A formed in a three-dimensional shape. In the present embodiment, as illustrated in FIG. 9, the molding head 20 molds a double flower, particularly a rose as the molding A. As illustrated in FIGS. 1 and 2, the molding head 20 is provided with a mounting part 21, an auxiliary part 22, and a molding part 23.

The mounting part 21 is formed in a bottomed tubular shape, and the molding part 23 is formed in a topped tubular shape. All the center axes of the mounting part 21 and the molding part 23 are located on a common axis. Hereinafter, this common axis is referred to as the head axis O2. The head axis O2 is located on the container axis O1. With respect to the direction along the head axis O2, the discharge container side is referred to as a lower side (a downside), and the opposite side of the discharge container side is referred to as an upper side (an upside). The direction along the head axis O2 is referred to as a vertical direction. In a plan view in which the molding head 20 is viewed in the vertical direction, a direction perpendicular to the head axis O2 is referred to as a radial direction, and a direction circling around the head axis O2 is referred to as a circumferential direction.

The mounting part 21 is mounted on the discharge hole 11 of the discharge container 10. The mounting part 21 is mounted on the discharge hole 11 via the stem 16. The mounting part 21 is mounted on the stem 16 to be rotatable around the head axis O2, and is lowered along with rotational movement relative to the stem 16. The mounting part 21 is provided with a fitting tube 24 that extends downwards. The fitting tube 24 is open to a bottom wall of the mounting part 21. The fitting tube 24 is disposed coaxially with the head axis O2, and is rotatably fitted around the stem 16. The fitting tube 24 is fitted around the stem 16 from the outside in a radial direction. The fitting tube 24 is provided with a protrusion 25 that protrudes inwards in a radial direction. The protrusion 25 is disposed in an annular shape that is coaxial with the head axis O2, and is in contact with the stem 16 from the upper side. The inside of the protrusion 25 acts as a communication hole 26 communicating with the inside of the discharge hole 11.

The auxiliary part 22 is provided independently of the mounting part 21, and is fixed to the mouth 12 of the discharge container 10. The auxiliary part 22 assists downward movement of the mounting part 21. The auxiliary part 22 is provided with a base part 27 and a ratchet part 28. The base part 27 is formed in a multiple tubular shape that is coaxial with the head axis O2. The base part 27 is fixed to the mouth 12 of the discharge container 10 to disable rotation around the head axis O2 and to disable upward movement. The base part 27 is provided with an outer tube part 29, a middle tube part 30, and an inner tube part 31.

The outer tube part 29 is formed in a double tubular shape, and is fitted around the mouth 12 of the discharge container 10 from the outside in the radial direction. In the illustrated example, the outer tube part 29 is swaged to the mouth 12 from the outside in the radial direction, and rotational movement of the base part 27 around the head axis O2 and upward movement of the base part 27 are restrained.

The middle tube part 30 and the inner tube part 31 are fitted into the annular concavity 15. The middle tube part 30 is fitted into an outer circumferential surface of the annular concavity 15 which faces the inside in the radial direction from the inside in the radial direction. An upper end of the middle tube part 30 is coupled to an upper end of the outer tube part 29 through an upside of the mouth 12 of the discharge container 10. The inner tube part 31 is fitted into an inner circumferential surface of the annular concavity 15 which faces the outside in the radial direction from the outside in the radial direction. A lower end of the inner tube part 31 is coupled to a lower end of the middle tube part 30 through an upside of a bottom of the annular concavity 15.

The ratchet part 28 is formed in a tubular shape that is coaxial with the head axis O2, and is fitted into the middle tube part 30 of the base part 27 from the inside in the radial direction. A gap is provided between an inner circumferential surface of the ratchet part 28 and an outer circumferential surface of the inner tube part 31. A pendent tube 32 extending downwards from the mounting part 21 is inserted into this gap. The pendent tube 32 is disposed coaxially with the head axis O2.

An upper end of the ratchet part 28 is provided with a flange 33 that protrudes toward the outside in the radial direction. The flange 33 is in contact with the base part 27 from above. A vertical gap is provided between the flange 33 and the bottom wall of the mounting part 21. This gap is an allowance gap S in which the downward movement of the mounting part 21 is allowed.

The ratchet part 28 is fixed to the base part 27 to disable rotation around the head axis O2. A first restraint mechanism 34 is provided between the ratchet part 28 and the base part 27. The first restraint mechanism 34 is provided with a pair of first protrusions that are respectively provided with the ratchet part 28 and the base part 27. The first protrusions are interlocked mutually, and thereby restrain relative rotational movement between the ratchet part 28 and the base part 27.

As illustrated in FIGS. 1 to 6, a conversion mechanism 35 is provided between the mounting part 21 and the mouth 12 of the discharge container 10. The conversion mechanism 35 converts rotational movement of the mounting part 21 relative to the stem 16 into downward movement of the mounting part 21 relative to the mouth 12. In the present embodiment, the conversion mechanism 35 is provided between the mounting part 21 and the mouth 12 of the discharge container 10 via the auxiliary part 22.

The conversion mechanism 35 is provided with first conversion parts 36 provided with the mounting part 21 and a second conversion part 37 provided with the auxiliary part 22. The first conversion parts 36 are formed in a projection shape that protrudes in the radial direction, and the second conversion part 37 is formed in a hole shape that is open in the radial direction. The first conversion parts 36 are disposed in the second conversion part 37. The first conversion parts 36 protrude from an outer circumferential surface of the pendent tube 32 toward the outside in the radial direction. The plurality of first conversion parts 36 are disposed at intervals in a circumferential direction. In the illustrated example, three first conversion parts 36 are provided at regular intervals in the circumferential direction.

The second conversion part 37 is provided on an inner circumferential surface of the ratchet part 28. The second conversion part 37 is formed in a recess shape that is open toward the inside in the radial direction and is not open to the outside in the radial direction. The second conversion part 37 continuously extends over the entire circumference in the circumferential direction. The second conversion part 37 is open downwards. The second conversion part 37 is blocked from above by a circumferential wall surface 38 that extends over the entire circumference in the circumferential direction and is directed downwards.

Figure 6:
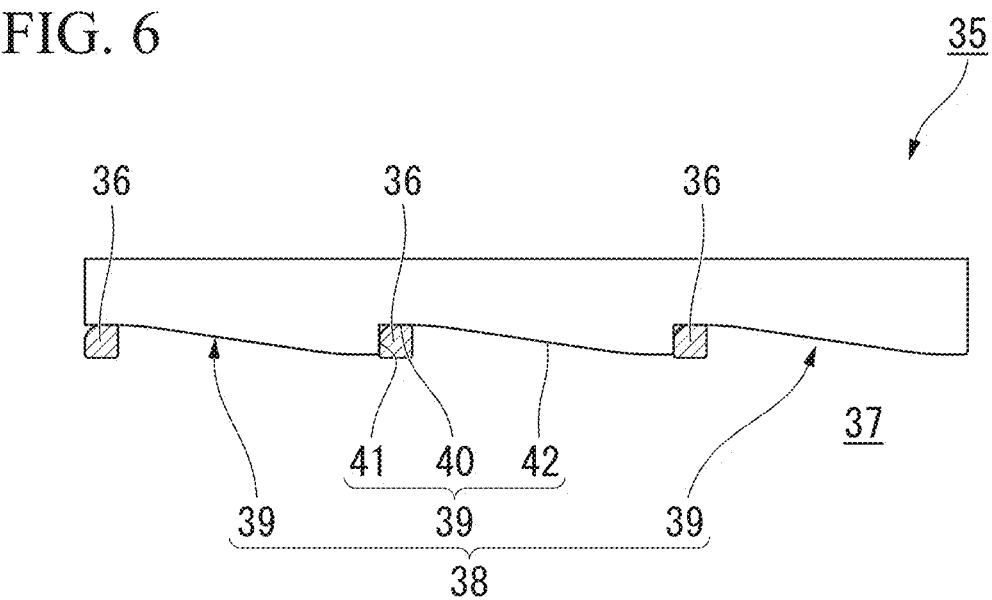
FIG. 6 is a development view of a conversion mechanism constituting the molding head illustrated in FIG. 1.

As illustrated in FIG. 6, the circumferential wall surface 38 is divided into a plurality of partition walls 39 in the circumferential direction. Each of the partition walls 39 is recessed upwards. The partition walls 39 are formed in the same shape and size. The plurality of partition walls 39 are linked in the circumferential direction. In the illustrated example, three partition walls 39 having the same number as that of first conversion parts 36 are provided in a linked manner. Each of the partition walls 39 is provided with a base wall 40, a restraint wall 41, and a guide wall 42.

The base wall 40 extends straight in the circumferential direction, and is directed downwards. The restraint wall 41 and the guide wall 42 separately extend downwards from opposite ends of the base wall 40 in the circumferential direction. The restraint wall 41 extends downwards from an end of one side of the base wall 40 in the circumferential direction, and is directed to the other side in the circumferential direction. The restraint wall 41 extends straight in a vertical direction. The guide wall 42 extends downwards from an end of the other side of the base wall 40 in the circumferential direction, and is directed to the one side in the circumferential direction. The guide wall 42 gradually extends toward the other side in the circumferential direction from below to above.

The restraint wall 41 and the guide wall 42 are formed in the same size in the vertical direction, and are formed, in the illustrated example, in the same size as that of the first conversion parts 36 in the vertical direction. A lower end of the restraint wall 41 and a lower end of the guide wall 42 are disposed at the same positions in the vertical direction. The lower end of the restraint wall 41 at one of the partition walls 39 is directly coupled to the lower end of the guide wall 42 of the partition wall 39 adjacent to the one of the partition walls 39 from the one side in the circumferential direction. The lower end of the guide wall 42 at one of the partition walls 39 is directly coupled to the lower end of the restraint wall 41 of the partition wall 39 adjacent to the one of the partition walls 39 from the other side in the circumferential direction.

The conversion mechanism 35 allows the rotational movement of the mounting part 21 relative to the stem 16 toward the other side in the circumferential direction while restraining the rotational movement of the mounting part 21 relative to the stem 16 toward the one side in the circumferential direction. The conversion mechanism 35 converts the rotational movement of the mounting part 21 relative to the stem 16 toward the other side in the circumferential direction into the downward movement of the mounting part 21 relative to the mouth 12.

In the conversion mechanism 35, in an initial state before handling, the first conversion parts 36 are close to or in contact with the base walls 40 of the partition walls 39 from below. When the mounting part 21 is turned toward the one side in the circumferential direction from the initial state, the first conversion parts 36 collide with the restraint walls 41, and thereby restrain further rotational movement of the mounting part 21.

On the other hand, when the mounting part 21 is turned toward the other side in the circumferential direction from the initial state, the first conversion parts 36 slide on the guide walls 42 in the circumferential direction. At this point, the first conversion parts 36 are guided downwards by the guide walls 42, and thereby the mounting part 21 gradually moves downwards against the upward biasing force of the stem 16. When the first conversion parts 36 reach the lower ends of the guide walls 42, the first conversion parts 36 ride over the guide walls 42 to the other side in the circumferential direction. Then, the mounting part 21 is raised along the restraint walls 41 by the upward biasing force of the stem 16, and the first conversion parts 36 are brought close to or into contact with the base walls 40 of the partition walls 39 from below again.

As described above, when the mounting part 21 is turned to the other side in the circumferential direction (in the same direction around the axis of the stem), the conversion mechanism 35 alternately repeats a descent state in which the mounting part 21 is lowered against the upward biasing force of the stem 16 and an ascent state in which the mounting part 21 is raised by the upward biasing force of the stem 16.

As illustrated in FIGS. 1 and 2, the molding part 23 is provided with a main body part 43 that is formed in a plate shape perpendicular to the head axis O2, and a handling tube part 44 that extends downwards from an outer periphery of the main body part 43. The molding part 23 is formed in a topped tubular shape by the main body part 43 and the handling tube part 44 in its entirety. The main body part 43 is provided with a sealing tube part 45 fitted into the mounting part 21. The sealing tube part 45 is disposed coaxially with the head axis O2, and extends downwards from the main body part 43.

The handling tube part 44 is fitted around the mounting part 21 from the outside in the radial direction, and surrounds the auxiliary part 22 from the outside in the radial direction. The molding part 23 is fixed to the mounting part 21 to disable relative rotation around the head axis O2. A second restraint mechanism 46 is provided between the molding part 23 and the mounting part 21. The second restraint mechanism 46 is provided with a pair of second protrusions that are respectively provided for the molding part 23 and the mounting part 21. The second protrusions are interlocked mutually, and thereby restrain relative rotational movement between the molding part 23 and the mounting part 21.

The molding part 23 is formed with a plurality of forming holes 47. The plurality of forming holes 47 pass through the main body part 43 in a vertical direction. The plurality of forming holes 47 are separately open to a molding surface 48 that is directed upwards at the main body part 43, and a feeding surface 49 that is directed downwards at the main body part 43. The molding surface 48 and the feeding surface 49 extend in a direction perpendicular to the head axis O2.

A diffusion chamber 50 is provided between the mounting part 21 and the molding part 23. The diffusion chamber 50 diffuses the discharge M discharged from the discharge hole 11 in a radial direction, and feeds the discharge M to the plurality of forming holes 47. The diffusion chamber 50 is disposed coaxially with the head axis O2, and communicates with the discharge hole 11 through the communication hole 26. A wall surface of the diffusion chamber 50 is partly formed by the feeding surface 49. A vertical dimension of the diffusion chamber 50 is, for example, 1.5 mm or more, and is set to 4.0 mm in the illustrated example.

The diffusion chamber 50 is provided with a restraint member 51 facing the discharge hole 11. The restraint member 51 is formed in a plate shape in which top and bottom surfaces thereof are directed in a vertical direction. The restraint member 51 is disposed coaxially with the head axis O2. The restraint member 51 faces the discharge hole 11 through the communication hole 26, and is formed with a diameter smaller than that of the communication hole 26. The restraint member 51 is coupled to an opening periphery of the communication hole 26 via bridge parts 52. The plurality of bridge parts 52 are disposed in a circumferential direction.

Figure 7:
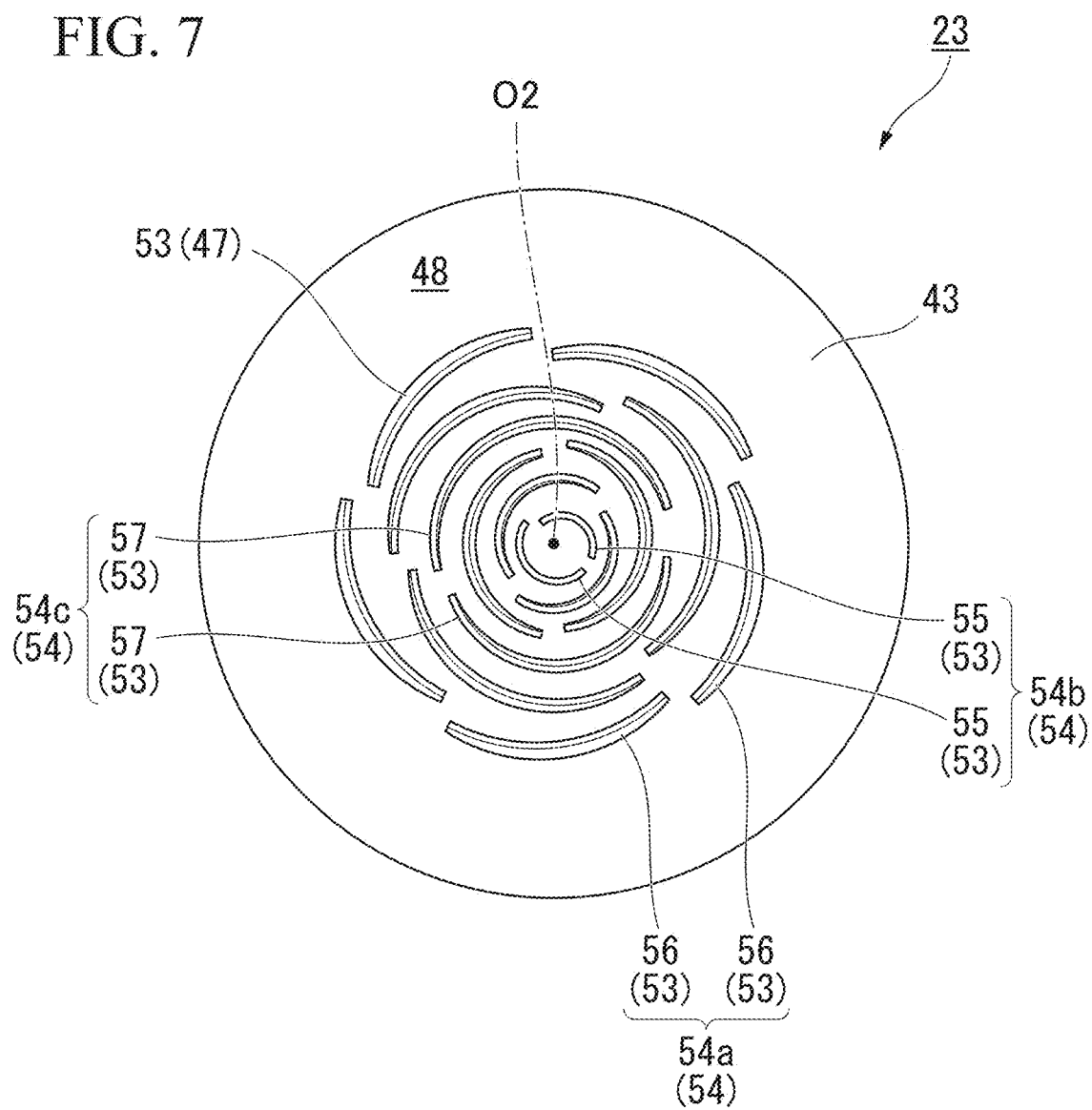
FIG. 7 is a top view of a molding part constituting the molding head illustrated in FIG. 1.

Here, as illustrated in FIG. 7, at least some of the plurality of forming holes 47 are formed as forming elongate holes 53 that are formed in an elongate hole shape. In the present embodiment, all of the plurality of forming holes 47 are formed as the forming elongate holes 53.

The forming elongate holes 53 extend in the circumferential direction circling around the head axis O2 perpendicular to the molding surface. The plurality of forming elongate holes 53 are disposed in the circumferential direction at intervals. The plurality of forming elongate holes 53 are disposed in the radial direction at intervals. In the present embodiment, the plurality of forming elongate holes 53 disposed in the circumferential direction at intervals form hole rows 54, and these hole rows 54 are multiply arranged round the head axis O2. A radial interval between the hole rows 54 adjacent to each other in the radial direction is set to, for example, about 1 mm to 5 mm. A radial interval between the forming elongate holes 53 adjacent to each other in the radial direction is less than 5 mm, and is particularly set to 0.5 to 3.5 mm.

In the present embodiment, the radial interval between the forming elongate holes 53 adjacent to each other in the radial direction increases from the inside to the outside in the radial direction step by step. For example, when first, second, and third forming elongate holes 53 are arranged from the inside to the outside in the radial direction in turn, a radial interval between the second and third forming elongate holes 53 is set to be equal or greater than that between the first and second forming elongate holes 53.

Figure 8:
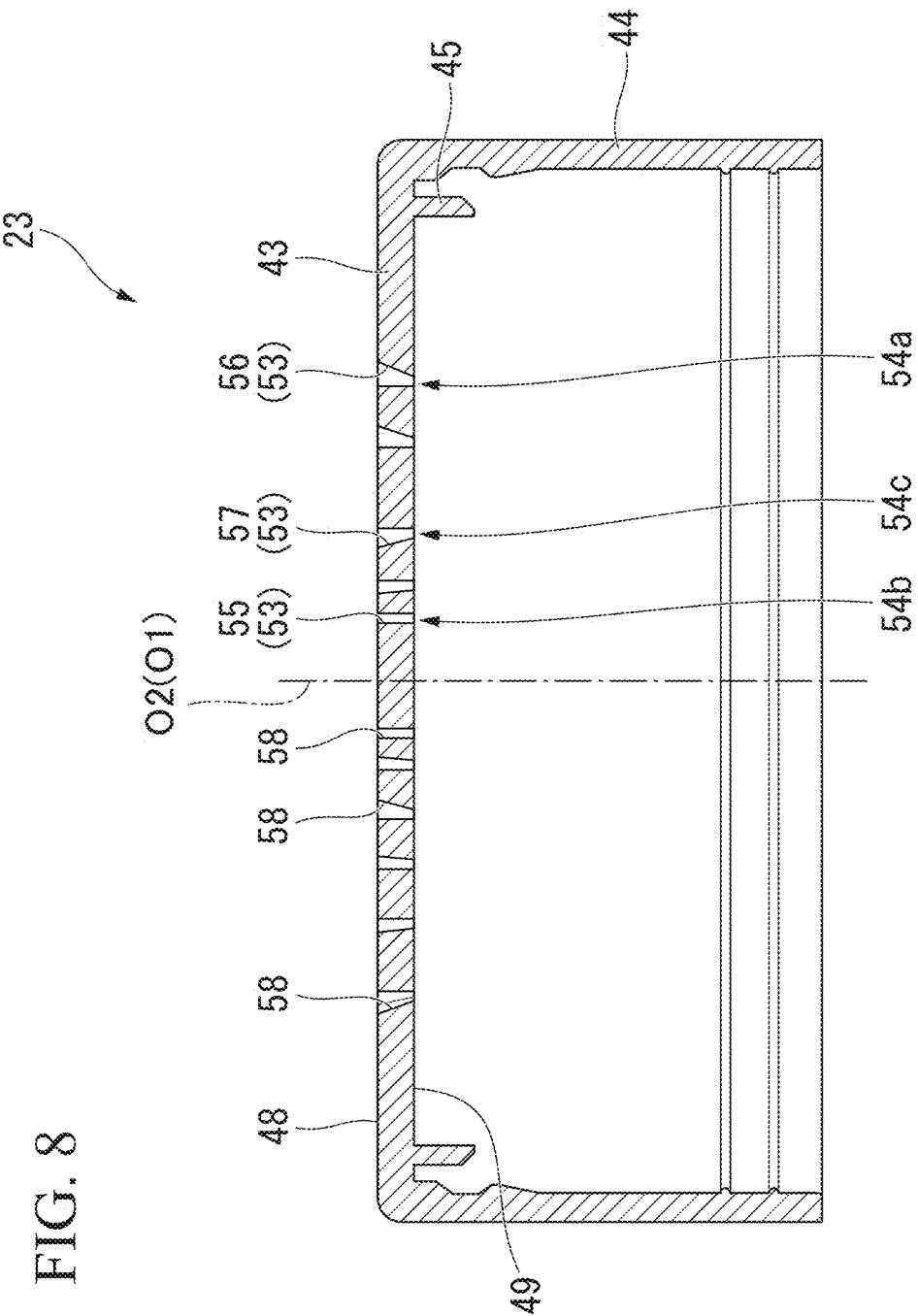
FIG. 8 is a longitudinal sectional view of the molding part constituting the molding head illustrated in FIG. 1.

As illustrated in FIG. 8, as the forming elongate holes 53, straight elongate holes 55 and oblique elongate holes 56 and 57 are provided. In each of the straight elongate holes 55, in wall surfaces by which this straight elongate hole 55 is defined, both of a pair of sidewall surfaces 58 extending in a direction in which the straight elongate hole 55 extends, extend straight in a vertical direction. The pair of sidewall surfaces 58 are directed in an orthogonal direction perpendicular to the direction in which the straight elongate hole 55 extends. A width of the straight elongate hole 55, which is a dimension in the orthogonal direction of the straight elongate hole 55, is uniform over the full length in the vertical direction, and is set to, for example, about 0.4 to 1.0 mm.

In the oblique elongate holes 56 and 57, one of a pair of sidewall surfaces 58 is inclined to be gradually separated from the other sidewall surface 58 as it approaches the molding surface 48, and the other sidewall surface 58 extends in the vertical direction. The other sidewall surface 58 may be slightly inclined in consideration of, for example, a draft taper of a metal mold.

Widths of the oblique elongate holes 56 and 57 gradually increase as they approach the molding surface 48. Widths of lower end openings of the oblique elongate holes 56 and 57 are smaller than widths of upper end openings of the oblique elongate holes 56 and 57. The widths of the lower end openings of the oblique elongate holes 56 and 57 are, for example, about 0.4 to 1.0 mm, and the widths of the upper end openings of the oblique elongate holes 56 and 57 are, for example, about 0.4 to 1.5 mm.

As the oblique elongate holes 56 and 57, outer oblique elongate holes 56 and inner oblique elongate holes 57 are provided. In the outer oblique elongate holes 56, one of the pair of sidewall surfaces 58 which is located on the outside in the radial direction is inclined. In the inner oblique elongate holes 57, one of the pair of sidewall surfaces 58 which is located on the inside in the radial direction is inclined.

Here, among the plurality of forming elongate holes 53, some located on the outermost side in the radial direction are the outer oblique elongate holes 56. In the present embodiment, all of the forming elongate holes 53 that form an outer hole row 54a located on the outside in the radial direction among the plurality of hole rows 54 serve as the outer oblique elongate holes 56, and all of the forming elongate holes 53 that form an inner hole row 54b located on the inside in the radial direction serve as the straight elongate holes 55. All of the forming elongate holes 53 that form intermediate hole rows 54c between the outer hole row 54a and the inner hole row 54b serve as the inner oblique elongate holes 57.

Meanwhile, in the present embodiment, widths of lower end openings of the plurality of forming elongate holes 53 are identical to one another, whereas widths of upper end openings of the forming elongate holes 53 increase from the forming elongate holes 53 located on the inside in the radial direction to the forming elongate holes 53 located on the outside in the radial direction step by step. For example, when the first and second forming elongate holes 53 are arranged from the inside to the outside in the radial direction in turn, the widths of the upper end openings of the second forming elongate holes 53 are equal to or greater than those of the upper end openings of the first forming elongate holes 53. The widths of the upper end openings of the forming elongate holes 53 may differ at positions in the circumferential direction (the directions in which the forming elongate holes 53 extend). In this case, the maximum widths of the upper end openings of the forming elongate holes 53 preferably increase from the forming elongate holes 53 located on the inside in the radial direction to the forming elongate holes 53 located on the outside in the radial direction step by step.

As described above, in the present embodiment, the widths of the straight elongate holes 55 are about 0.4 to 1.0 mm, and all of the forming elongate holes 53 forming the inner hole row 54b serve as the straight elongate holes 55. As a result, the widths of the lower end openings of the forming elongate holes 53 located on the innermost side in the radial direction among the plurality of forming elongate holes 53 are set to be less than 2 mm, and are provided to be small, for example, in a formable range. When the widths of the lower end openings of the forming elongate holes 53 located on the innermost side in the radial direction among the plurality of forming elongate holes 53 differ at positions in the circumferential direction (the direction in which the forming elongate holes 53 extend), the maximum widths of the lower end openings of the forming elongate holes 53 are preferably set to be less than 2 mm.

Next, an operation of the molding head 20 illustrated in FIG. 1 will be described.

In the molding head 20, first, the stem 16 is lowered to discharge the discharge M from the discharge hole 11. At this point, the molding part 23 is rotated relative to the discharge container 10. Thereby, the mounting part 21 is rotated around the head axis O2 relative to the stem 16 via the molding part 23. Then, the rotational movement of the mounting part 21 is converted into downward movement of the mounting part 21 by the conversion mechanism 35, and the mounting part 21 moves down relative to the mouth 12 of the discharge container 10 along with the stem 16 while narrowing the allowance gap S in a vertical direction. Thereby, the discharge M is discharged from the discharge hole 11 inside the stem 16.

The discharge M discharged from the discharge hole 11 is fed into the diffusion chamber 50 through the communication hole 26 and a space between the bridge parts 52 adjacent to each other in the circumferential direction while straight movement thereof is being restrained by restraint member 51. The discharge M fed into the diffusion chamber 50 is diffused in the radial direction, and is fed from the feeding surface 49 to the plurality of forming holes 47. As in the present embodiment, since the vertical dimension of the diffusion chamber 50 is 1.0 mm or more, the discharge M can be effectively diffused in the radial direction. Furthermore, since the vertical dimension of the diffusion chamber 50 is 1.5 mm or more, the discharge M can be more effectively diffused in the radial direction.

When the discharge M is formed by being separately passed through the plurality of forming holes 47, a plurality of molded pieces A1 are formed as illustrated in FIG. 9. These molded pieces A1 are combined on the molding surface 48, and thereby a molding A is formed. The molded pieces A1 molded by the forming elongate holes 53 are formed to have long shapes in directions in which the forming elongate holes 53 extend.

As described above, according to the molding head 20 of the present embodiment, as illustrated in FIG. 1, the diffusion chamber 50 is provided between the mounting part 21 and the molding part 23. For this reason, the discharge M is inhibited from being concentrated on and fed to specific some of the plurality of forming holes 47, and the discharge M can be fed to each of the forming holes 47 such that a variation in an amount of feeding of the discharge M for each of the forming holes 47 is reduced. Thereby, the discharge M is inhibited from being fed to the forming holes 47 too much or little, and a moderate amount of discharge M can be fed to each of the forming holes 47. Therefore, the molded pieces A1 formed by the respective forming holes 47 can be accurately formed, and the molding A can be accurately formed. In the present embodiment, since the vertical dimension of the diffusion chamber 50 is equal to or greater than 1.5 mm, the vertical dimension (the height) of the diffusion chamber 50 can be sufficiently secured. Thereby, the discharge M can be effectively diffused in the radial direction. For example, the discharge M is also passed through the forming holes 47 located on the outermost side in the radial direction among the plurality of forming holes 47, and the molded pieces A1 can be easily molded.

The restraint member 51 is provided with the diffusion chamber 50. For this reason, the straight movement of the discharge M discharged from the discharge hole 11 can be restrained by the restraint member 51. Thereby, the discharge M can be effectively diffused in the diffusion chamber 50.

The mounting part 21 is mounted around the discharge hole 11 via the stem 16. For this reason, the stem 16 is lowered by lowering the mounting part 21, and the discharge M can be discharged from the discharge hole 11, and the discharge M can be easily discharged.

The mounting part 21 is lowered along with the rotational movement relative to the stem 16. For this reason, the mounting part 21 can be lowered together with the stem 16 by rotating the mounting part 21 relative to the stem 16. Thereby, for example, in comparison with when the mounting part 21 is depressed and lowered, an amount of movement and a moving speed when the mounting part 21 moves down can be easily stabilized. Therefore, an amount of discharge and a discharge speed of the discharge M discharged from the discharge hole 11 can be stabilized. As a result, the discharge M can be effectively diffused in the diffusion chamber 50.

When the mounting part 21 is turned to the other side in the circumferential direction, the conversion mechanism 35 alternately repeats being in the descent state and the ascent state. For this reason, for example, the mounting part 21 can be inhibited from excessively moving down along with the rotational movement of the mounting part 21. Thereby, the discharge M can be effectively diffused in the diffusion chamber 50.

As illustrated in FIG. 9, the forming elongate holes 53 extend in the circumferential direction. Thereby, for example, the molded pieces A1, each of which is similar to one of petals, can be formed on the molding surface 48 by the forming elongate holes 53. Further, the plurality of forming elongate holes 53 are arranged in the circumferential direction at intervals. For this reason, the plurality of molded pieces A1 like petals can be arranged on the molding surface 48 in the circumferential direction side by side. Thereby, for example, an ornamental crown can be easily accurately molded by all of these plurality of molded pieces A1. Furthermore, the plurality of forming elongate holes 53 are arranged in the radial direction at intervals. For this reason, the plurality of molded pieces A1 like petals can be multiply arranged on the molding surface 48 in the radial direction. Thereby, for example, a double flower such as a rose can be easily molded with high accuracy.

Here, in the oblique elongate holes 56 and 57, one of the sidewall surfaces 58 is inclined as described above. Thereby, among the plurality of molded pieces A1, the molded pieces A1 molded by the oblique elongate holes 56 and 57 can be erected while being inclined in a direction in which one of the sidewall surfaces 58 is inclined without being erected upright on the molding surface 48. Therefore, the molded pieces A1 formed by the forming elongate holes 53 can be erected while being inclined in a desired direction according to the shape of the molding A, and the molding A can be formed with high accuracy.

Among the plurality of forming elongate holes 53, those located on the outermost side in the radial direction are the outer oblique elongate holes 56. For this reason, the molded pieces A1 formed on the molding surface 48 at portions located on the outside in the radial direction by the forming elongate holes 53 can be erected while being inclined to the outside in the radial direction. Thereby, for example, the molded pieces A1 equivalent to petals located on an outer circumference of a double flower can be directed to the outside in the radial direction, and the molding A such as a flower can be accurately molded.

In the present embodiment, all of the forming elongate holes 53 provided with the outer hole row 54a serve as the outer oblique elongate holes 56; all of the forming elongate holes 53 provided for the inner hole row 54b serve as the straight elongate holes 55; and all of the forming elongate holes 53 provided for the intermediate hole rows 54c serve as the inner oblique elongate holes 57. Therefore, although the molded pieces A1 formed on an outer circumference of the molding surface 48 in the radial direction are erected while being inclined to the outside in the radial direction, the molded pieces A1 formed at the center of the molding surface 48 in the radial direction can be closed up on the inside in the radial direction. Thereby, for example, the double flower can be easily molded with higher accuracy.

The widths of the lower end openings of the forming elongate holes 53 located on the innermost side in the radial direction among the plurality of forming elongate holes 53 are less than 2 mm, and can be kept narrow. Therefore, when the discharge M is discharged from the discharge hole 11 on the inside in the radial direction, the discharge M inside the diffusion chamber 50 can be inhibited from passing through the forming elongate holes 53 located on the innermost side in the radial direction among the plurality of forming elongate holes 53. Thereby, it can be easy to effectively diffuse the discharge M in the diffusion chamber 50 toward the outside in the radial direction.

Since the radial interval between the forming elongate holes 53 adjacent to each other in the radial direction is less than 5 mm, the forming elongate holes 53 can be moderately close to each other. Thereby, the molded pieces A1 can be inhibited from being excessively separated on the molding surface 48, and the plurality of molded pieces A1 can be easily accurately combined on the molding surface 48. In the present embodiment, since the radial interval between the forming elongate holes 53 adjacent to each other in the radial direction gradually increases from the inside to the outside in the radial direction, the molded pieces A1 formed by the forming elongate holes 53 located on the outside in the radial direction can be easily be made to open widely toward the outside in the radial direction.

Further, in the present embodiment, the widths of the upper end openings of the forming elongate holes 53 increase from the forming elongate holes 53 located on the inside in the radial direction to the forming elongate holes 53 located on the outside in the radial direction step by step. Thereby, the molded pieces A1 formed by the forming elongate holes 53 can be formed to become larger from the inside to the outside in the radial direction step by step.

(Second Embodiment)

Next, a molding head according to a second embodiment of the present invention will be described with reference to FIG. 10. In the second embodiment, portions the same as components in the first embodiment are given the same signs, and description thereof will be omitted. Only differences will be described.

Figure 10:
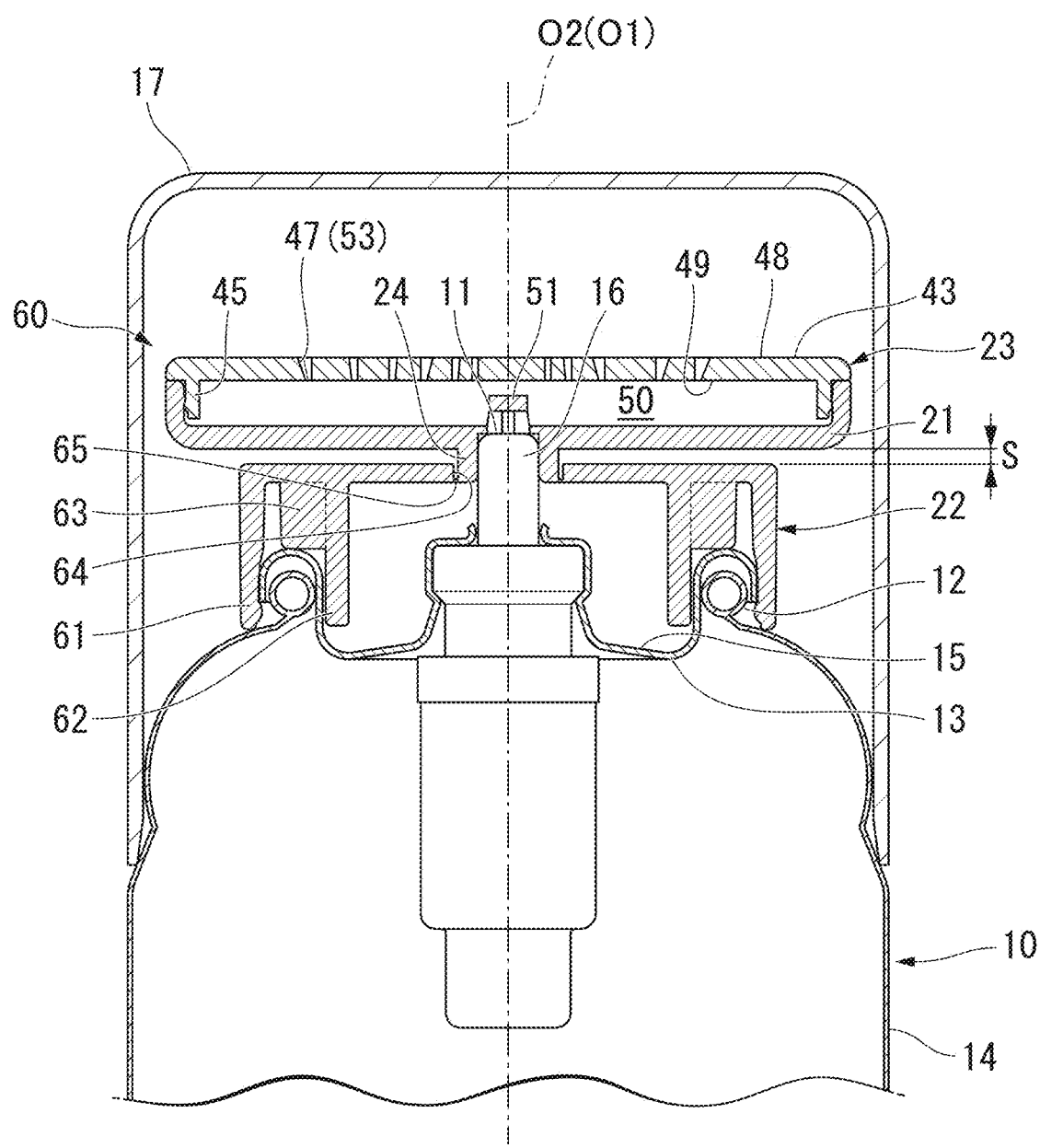
FIG. 10 is a longitudinal sectional view of a molding head according to a second embodiment of the present invention.

As illustrated in FIG. 10, an over cap 17 covering a molding head 60 is detachably mounted on a discharge container 10 according to the present embodiment. Further, in the molding head 60 according to the present embodiment, a handling tube part 44 is not provided in a molding part 23, and a conversion mechanism 35 is not provided between the mounting part 21 and a mouth 12 of the discharge container 10. In place of providing a base part 27 and a ratchet part 28, the auxiliary part 22 is formed integrally with the mounting part 21.

In the present embodiment, an auxiliary part 22 is formed in a topped tubular shape, and is disposed coaxially with a head axis O2. A circumferential wall of the auxiliary part 22 is formed in a double tubular shape, and is provided with an outer circumferential wall 61 and an inner circumferential wall 62. The outer circumferential wall 61 is fitted around a mouth 12 of the discharge container 10 from an outside in a radial direction, and the inner circumferential wall 62 is fitted into the mouth 12 from an inside in a radial direction. The inner circumferential wall 62 is provided with longitudinal ribs 63 that protrude on the outside in the radial direction. The plurality of longitudinal ribs 63 are disposed in a circumferential direction at intervals. Lower ends of the longitudinal ribs 63 are disposed above an opening edge of the mouth 12, and upper ends of the longitudinal ribs 63 are coupled to a top wall of the auxiliary part 22.

An insertion hole 64 into which a stem 16 is inserted is formed in the top wall of the auxiliary part 22. The insertion hole 64 is disposed coaxially with the head axis O2. A fitting tube 24 of the mounting part 21 is inserted into the insertion hole 64. An opening periphery of the insertion hole 64 is coupled to the fitting tube 24 via a weakened part 65. The weakened part 65 extends intermittently or continuously over the entire circumference in the circumferential direction. The weakened part 65 can be broken, for example, when the molding head 60 is attached to the discharge container 10 or when use of the discharge container 10 is initiated. In the present embodiment, the mounting part 21 and the auxiliary part 22 are integrally formed via the weakened part 65. Thereby, the number of components can be reduced. An allowance gap S is provided between the top wall of the auxiliary part 22 and a bottom wall of the mounting part 21.

Next, a method of discharging a discharge M from a discharge hole 11 in the molding head 60 will be described. At this point, the over cap 17 is separated from the discharge container 10 in advance.

When the discharge M is discharged from the discharge hole 11, the molding part 23 is depressed. Then, the mounting part 21 moves down relative to the mouth 12 of the discharge container 10 along with the stem 16 while narrowing the allowance gap S in a vertical direction. Thereby, the discharge M is discharged from the discharge hole 11 inside the stem 16. When the allowance gap S is narrowed and the bottom wall of the mounting part 21 comes into contact with the top wall of the auxiliary part 22, downward movement of the mounting part 21 is restrained. When the discharging of the discharge M from the discharge hole 11 is stopped, the depression of the molding part 23 is released. Then, the mounting part 21 and the molding part 23 are raised by an upward biasing force of the stem 16.

In the present embodiment, the auxiliary part 22 and the mounting part 21 are integrally formed via the weakened part 65. However, the auxiliary part 22 and the mounting part 21 may be formed by separate members without the weakened part 65. In the present embodiment, the auxiliary part 22 is provided, but the auxiliary part 22 may not be required. In this case, for example, the allowance gap S can be provided between the mouth 12 of the discharge container 10 and the bottom wall of the mounting part 21.

The technical scope of the present invention is not limited to the first and second embodiments, and can be variously modified without departing from the scope of the present invention.

In the first and second embodiments, a main body part 43 of the molding part 23 is orthogonal to the head axis O2, but the present invention is not limited thereto. For example, the main body part 43 may be formed in a spherical shape that protrudes downwards.

In the first and second embodiments, all forming elongate holes 53 provided for an outer hole row 54a serve as outer oblique elongate holes 56, all forming elongate holes 53 provided for an inner hole row 54b serve as straight elongate holes 55, and all forming elongate holes 53 provided for intermediate hole rows 54c serve as inner oblique elongate holes 57. However, the present invention is not limited thereto. For example, the straight elongate holes 55, the outer oblique elongate holes 56, and the inner oblique elongate holes 57 may be provided for the inner hole row 54b or the intermediate hole rows 54c in a mixed state. In the first and second embodiments, among the plurality of forming elongate holes 53, those located on the outermost side in the radial direction are outer oblique elongate holes 56, but the present invention is not limited thereto. For example, the outer hole row 54a may be made up of the straight elongate holes 55 or the inner oblique elongate holes 57.

In the first and second embodiments, widths of upper end openings of the forming elongate holes 53 increase from the forming elongate holes 53 located on the inside in the radial direction to the forming elongate holes 53 located on the outside in the radial direction step by step, but the present invention is not limited thereto. When maximum widths (hereinafter referred to as "first maximum widths") of the upper end openings of the forming elongate holes 53 located on the outermost side in the radial direction among the plurality of forming elongate holes 53 are greater than those (hereinafter referred to as "second maximum widths") of the upper end openings of the forming elongate holes 53 located on the innermost side in the radial direction, maximum widths of the upper end openings of the other forming elongate holes 53 located between these forming elongate holes 53 in the radial direction are preferably between the first and second maximum widths.

In the first and second embodiments, a plurality of forming elongate holes 53 are arranged in the radial direction at intervals, but the present invention is not limited thereto. For example, only one hole row 54 rather than multiple hole rows 54 may be provided. In the first and second embodiments, the plurality of forming elongate holes 53 are arranged in the circumferential direction at intervals, but the present invention is not limited thereto. For example, no hole rows 54 may be formed. In the first and second embodiments, the forming elongate holes 53 extend in the circumferential direction, but the present invention is not limited thereto. For example, the forming elongate holes 53 may extend in the radial direction.

In the first and second embodiments, as the oblique elongate holes 56 and 57, the outer oblique elongate holes 56 and the inner oblique elongate holes 57 are provided, but the present invention is not limited thereto. For example, as the oblique elongate holes 56 and 57, only one of the outer oblique elongate holes 56 and the inner oblique elongate holes 57 may be provided. In the first and second embodiments, as the forming elongate holes 53, the straight elongate holes 55 and the oblique elongate holes 56 and 57 are provided, but the present invention is not limited thereto. For example, as the forming elongate holes 53, only one of the straight elongate holes 55 and the oblique elongate holes 56 and 57 may be provided. In the first and second embodiments, all of the plurality of forming holes 47 serve as the forming elongate holes 53 formed in an elongate hole shape, but the present invention is not limited thereto. For example, some or all of the plurality of forming holes 47 may have an exact circle shape or a square shape in a top view.

In the first and second embodiments, the molding heads 20 and 60 are configured to mold the double flower as the molding A, but the present invention is not limited thereto. For example, a letter or a logotype may be molded by the molding heads 20 and 60.

The conversion mechanism 35 is not limited to the form represented in the first embodiment. The conversion mechanism 35 may be appropriately modified into another constitution in which the rotational movement of the mounting part 21 relative to the stem 16 is converted into the downward movement of the mounting part 21 relative to the mouth 12. For example, in the conversion mechanism 35 illustrated in FIG. 6, the number of partition walls 39 in the circumferential direction may be made different from three, and may be set to, for example, two or four. In this way, as the number of partition walls 39 in the circumferential direction is changed, for example, the amount of discharge or the discharge speed of the discharge M discharged from the discharge hole 11 can be adjusted. Further, for example, the first conversion parts 36 may be formed in a hole shape, and the second conversion part 37 may be formed in a protrusion shape.

In the first and second embodiments, the aerosol can is adopted as the discharge container 10, but the present invention is not limited thereto. The discharge container 10 may be appropriately modified into another constitution in which the discharge hole 11 is provided inside the stem 16. For example, a discharge container 10 provided with a discharger having a pump mechanism may be adopted. Further, as the discharge container 10, another constitution in which the discharge hole 11 is not provided inside the stem 16 may be adopted. For example, a tube container or a bottle container in which the base 14 can undergo squeeze deformation may be adopted.

In the first and second embodiments, the diffusion chamber 50 is provided with the restraint member 51, but the present invention is not limited thereto. The restraint member 51 may not be provided in the diffusion chamber 50.

In the first and second embodiments, in the initial state before handling, the diffusion chamber 50 is formed between the mounting part 21 and the molding part 23, but the present invention is not limited thereto. The discharge container 10 may be appropriately modified into another form in which the diffusion chamber 50 is formed when the discharge M at least discharged from the discharge hole 11 and passes through the forming holes 47. For example, a constitution in which the mounting part 21 is provided in the molding part 23 to be movable up and down, and the mounting part 21 is displaced up and down between an upper standby position at which it is in contact with or close to the feeding surface 49 and a lower discharge position at which the diffusion chamber 50 is formed between the mounting part 21 and the molding part 23 may be adopted. In this case, when the mounting part 21 is located at the discharge position (for example, at a descent end position), the vertical dimension of the diffusion chamber 50 is preferably equal to or greater than 1.5 mm.

(Third Embodiment)

Hereinafter, a molding head according to a third embodiment of the present invention will be described with reference to FIGS. 11 to 14. As illustrated in FIGS. 11 to 14, a molding head 144 is provided with a molding part 114 and a mounting part 115, and is mounted on a discharge container 111. The discharge container 111 discharges a content capable of holding a shape at least for a certain time after, for example, a foam or a high-viscosity material is discharged.

In the present embodiment, all the center axes of a mouth 116, a base 120, and a bottom (not shown) of the discharge container 111 are disposed on a common container axis O1. The mounting part 115 is formed in a topped tubular shape, and the molding part 114 is formed in a topped tubular shape. All the center axes of the mounting part 115 and the molding part 114 are disposed on a common axis. Hereinafter, the common axis is referred to as a head axis O2. The head axis O2 is located on the container axis O1. In a direction along the head axis O2, the discharge container 111 side is referred to as a lower side (a downside), and the opposite side of the discharge container 111 side is referred to as an upper side (an upside). The direction along the head axis O2 is referred to as an upward/downward direction (a vertical direction). In a top view in which the molding head 144 is viewed in the vertical direction, a direction perpendicular to the head axis O2 is referred to as a radial direction, and a direction circling around the head axis O2 is referred to as a circumferential direction.

The discharge container 111 has a bottomed tubular shape, and is formed in a sealed container shape because the mouth 116 of this discharge container 111 is covered with a top wall 117. The top wall 117 is provided with an annular concavity 118 that extends in the circumferential direction. The annular concavity 118 is recessed downwards. A discharger 112 is provided with a stem 119 that is vertically provided for the mouth 116 of the discharge container 111 to be movable down in an upward biased state. The stem 119 is disposed coaxially with the head axis O2, and is formed in a smaller diameter than the annular concavity 118. The stem 119 passes through the top wall 117. A discharge valve (not shown) is provided at a portion of the stem 119 which is located inside the discharge container 111.

When the stem 119 is depressed with respect to the discharge container 111, the discharge valve is opened, and a content inside the discharge container 111 is discharged from an upper end of the stem 119 through the inside of the stem 119. At this point, in the present embodiment, the internal content of the discharge container 111 which is formed, for example, in a foam shape is discharged from the upper end of the stem 119. When the depression of the stem 119 is released, the stem 119 is raised by an upward biasing force acting on the stem 119, and the discharge valve is closed, so that the discharging of the content is stopped. The discharge container 111 and the discharger 112 discharge the content contained in the discharge container 111 from the stem 119. In the illustrated example, as the discharge container 111, an aerosol can in which a liquid content is contained is adopted.

The base part 113 is fixed to the mouth 116 of the discharge container 111 to surround the stem 119 from an outside in the radial direction. The base part 113 is formed in a multiple tubular shape that is coaxial with the head axis O2. The base part 113 is fixed to the mouth 116 of the discharge container 111 to disable rotation around the head axis O2 and upward movement. The base part 113 is provided with an outer tube part 121, an inner tube part 122, and a connection part 123.

The outer tube part 121 is formed in a double tubular shape, and is fitted around the mouth 116 of the discharge container 111 from the outside in the radial direction. In the illustrated example, the outer tube part 121 is swaged to the mouth 116 from the outside in the radial direction. Thereby, rotational movement of the base part 113 around the head axis O2 and upward movement of the base part 113 are restrained. A top-view shape of the outer tube part 121 which is a shape of the outer tube part 121 in a top view in which the outer tube part 121 is viewed in the vertical direction has an exact circle shape that is coaxial with the head axis O2.

The inner tube part 122 is fitted into the annular concavity 118. The inner tube part 122 is fitted into an outer circumferential surface of the annular concavity 118, which faces an inside in the radial direction, from the inside in the radial direction. An upper end of the inner tube part 122 is located above an upper end of the outer tube part 121. The connection part 123 is disposed above the mouth 116 of the discharge container 111. The connection part 123 connects the upper ends of the inner tube part 122 and the outer tube part 121 to each other.

The molding part 114 has a main body part 124 disposed above the stem 19. The main body part 124 is formed in a plate shape perpendicular to the head axis O2. In the present embodiment, the outer tube part 121 is formed in a double tubular shape having an annular groove that is open toward the upside, and a lower end of a circumferential wall 114a of the molding part 114 is fitted into the annular groove. A top-view shape of the molding part 114 has a circle shape that is coaxial with the head axis O2.

The molding part 114 is provided with a core 125 and forming holes 126. The core 125 extends downwards from the main body part 124. The core 125 extends in the vertical direction, and is disposed coaxially with the head axis O2. The core 125 is located above an edge of the upper end of the stem 119. An outer diameter of the core 125 is smaller than an inner diameter of the stem 119, and the core 125 faces an inside of the upper end of stem 119 in the vertical direction. The core 125 is formed in a solid rod or post shape. The core 125 is formed in a multistage post shape in which outer diameters are different according to a vertical position. The core 125 is provided with an upper large diameter part and a lower small diameter part.

The plurality of forming holes 126 are formed in the molding part 114. The plurality of forming holes 126 pass through the main body part 124 in the vertical direction. The plurality of forming holes 126 are separately open to a molding surface 127 that is directed upwards at the main body part 124, and a feeding surface 128 that is directed downwards at the main body part 124. The molding surface 127 and the feeding surface 128 extend in a direction perpendicular to the head axis O2.

The forming holes 126 are formed in an elongate hole shape extending in the circumferential direction. The plurality of forming holes 126 are disposed in the circumferential and radial directions at intervals. In the present embodiment, the plurality of forming holes 126 disposed in the circumferential direction at intervals form hole rows 129, and these hole rows 129 are multiply arranged around the head axis O2. The hole rows 129 are disposed to surround the core 125 from the outside in the radial direction in a top view.

The mounting part 115 is provided inside the molding part 114 to be movable up and down. The mounting part 115 is provided with a pot main body 130, a guide tube 131, and an insertion part 132. The pot main body 130 is fitted into the molding part 114, and an outer periphery thereof slides on an inner circumferential surface of the molding part 114 in the vertical direction. The pot main body 130 is fitted into an upper portion of the inner circumferential surface of the molding part 114. A top-view shape of the pot main body 130 has the same shape and size as that of the upper portion of the inner circumferential surface of the molding part 114.

The pot main body 130 is formed with a communication hole 133. The communication hole 133 passes through the pot main body 130 in the vertical direction. The communication hole 133 is disposed coaxially with the head axis O2. The communication hole 133 has a larger diameter than the core 125, and the core 125 is inserted into the communication hole 133. The communication hole 133 has a smaller diameter than an outer diameter of the stem 119.

The guide tube 131 extends downwards from the pot main body 130, and is inserted into the stem 119. The guide tube 131 is disposed coaxially with the head axis O2. The guide tube 131 has a larger diameter than the stem 119, and is inserted into the stem 119 from the outside in the radial direction. The guide tube 131 is inserted into the stem 119 to enable relative rotation around the head axis O2. The insertion part 132 is inserted into the base part 113. The insertion part 132 extends downwards from the pot main body 130. The insertion part 132 is formed in a tubular shape disposed coaxially with the head axis O2. The insertion part 132 has a larger diameter than the guide tube 131, and is fitted into the base part 113.

Figure 11:
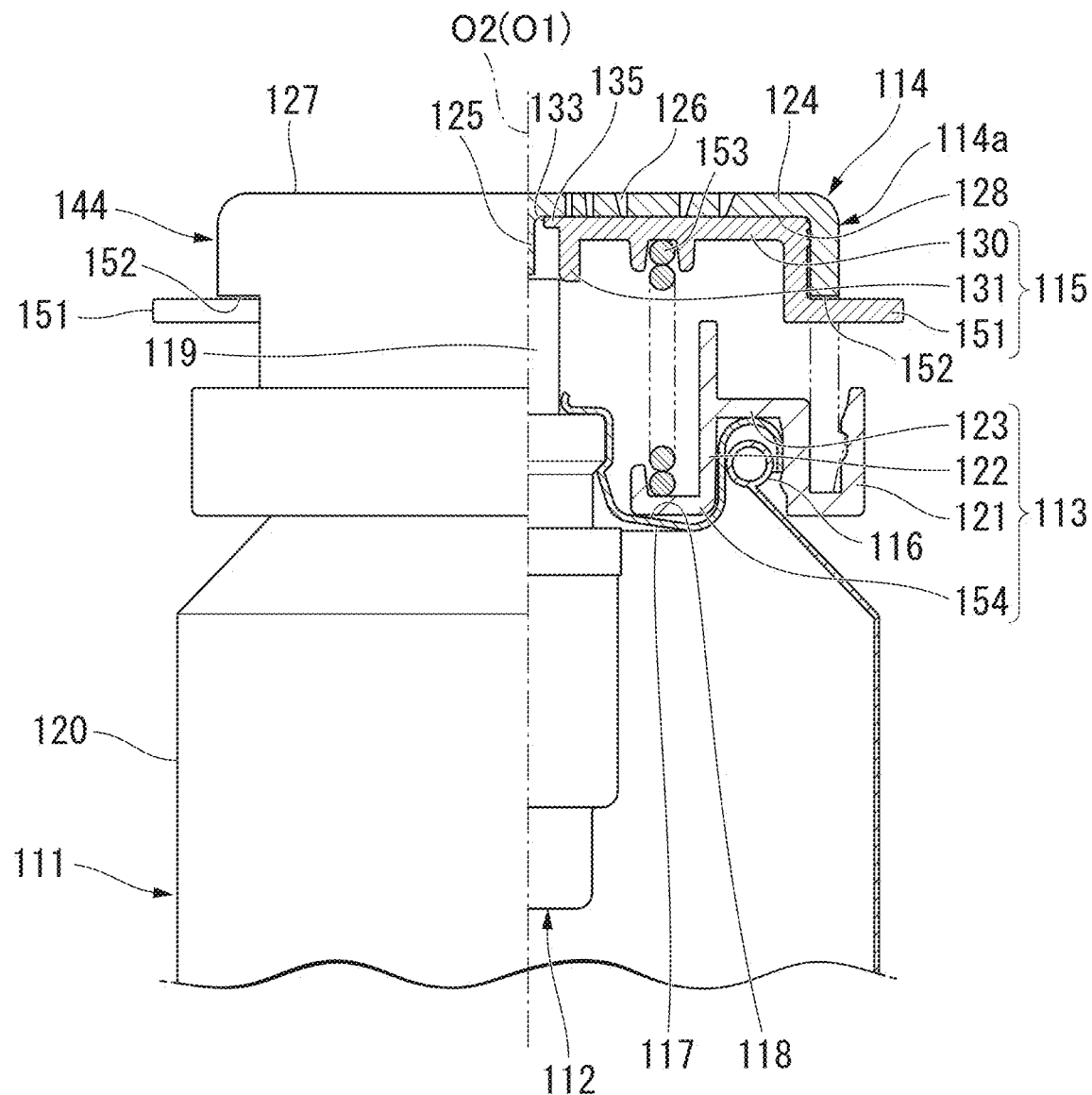
FIG. 11 is a longitudinal half sectional view of a molding head according to a third embodiment of the present invention, and is view illustrating a state in which a mounting part is located at a standby position.
Figure 13:
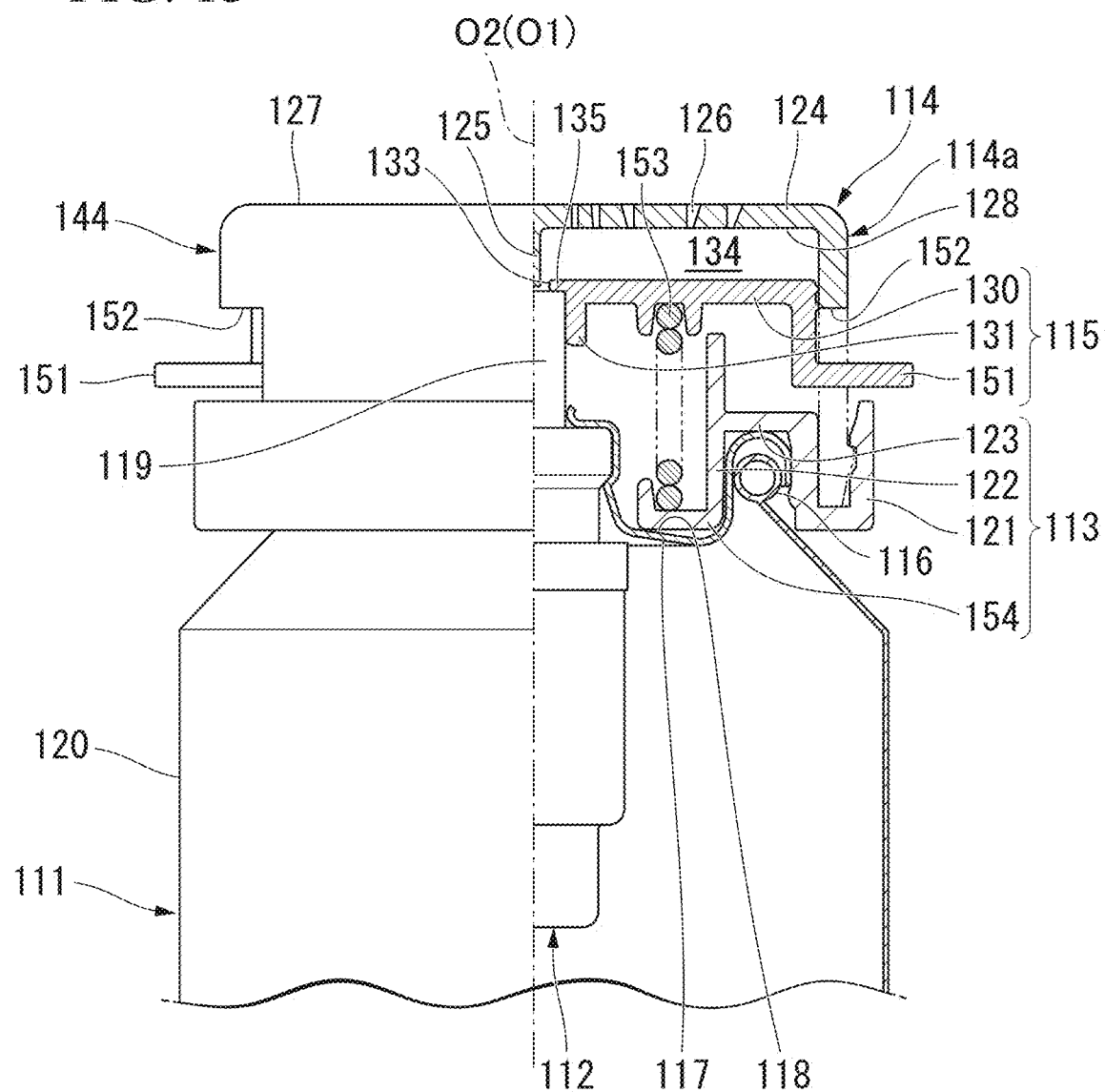
FIG. 13 is a longitudinal half sectional view of the molding head illustrated in FIG. 11, and is view illustrating a state in which the mounting part is located at a discharge position.

The mounting part 115 moves up and down between an upper standby position illustrated in FIG. 11 and a discharge position illustrated in FIG. 13. As illustrated in FIG. 11, the mounting part 115 is in contact with or close to the feeding surface 128 at the standby position. When the mounting part 115 is located at the standby position, the large diameter part of the core 125 is inserted into the communication hole 133, and a lower end of the guide tube 131 is inserted into the upper end of the stem 119.

As illustrated in FIG. 13, the mounting part 115 is separated upwards from the feeding surface 128 at the discharge position, and a diffusion chamber 134 is formed between the mounting part 115 and the molding part 114. The diffusion chamber 134 diffuses the content from the stem 119 in a direction along the molding surface 127 such as the radial direction, and feeds the content to the plurality of forming holes 126. The diffusion chamber 134 is disposed coaxially with the head axis O2. The diffusion chamber 134 is formed in a flat shape that is larger in the radial direction than in the vertical direction. A wall surface of the diffusion chamber 134 is partly defined by the feeding surface 128.

When the mounting part 115 is located at the discharge position, a locking part 135 formed by an open periphery of the communication hole 133 at the pot main body 130 is locked to the stem 119. The locking part 135 is in contact with the edge of the upper end of the stem 119 from above, and lowers the stem 119 along with the downward movement of the mounting part 115. At this point, the communication hole 133 communicates with the inside of the stem 119 and the diffusion chamber 134. At this point, the pot main body 130 of the mounting part 115 is located below the core 251, and the core 251 is disposed inside the diffusion chamber 134.

Figure 12:
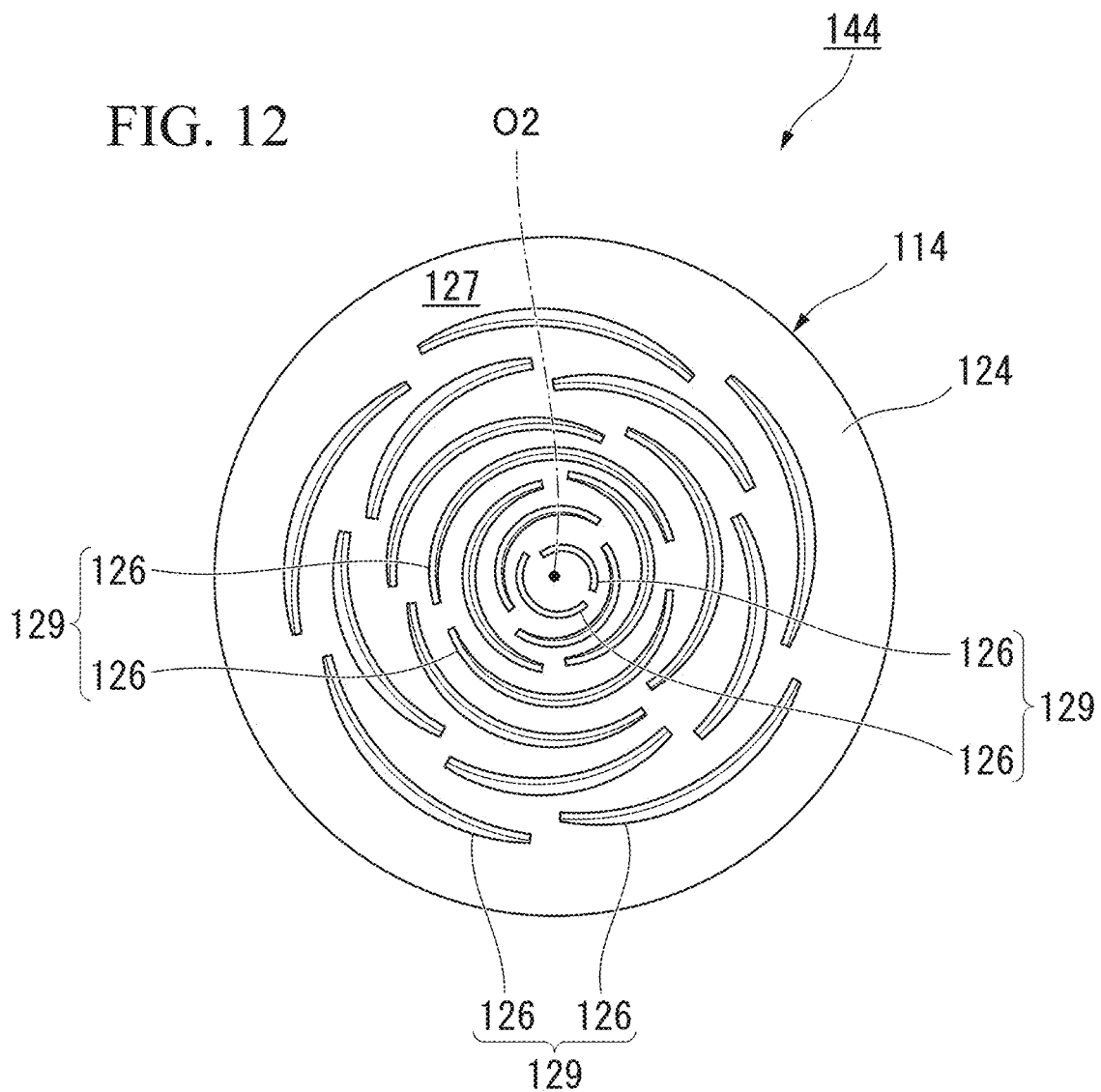
FIG. 12 is a top view of a molding part constituting the molding head illustrated in FIG. 11.

In the molding head 144 of the present embodiment, as illustrated in FIGS. 11 and 12, the mounting part 115 is provided with depressing parts 151 that can be depressed from the outside. The depressing parts 151 protrude from the pot main body 130 of the mounting part 115 toward the outside in the radial direction. The pair of depressing parts 151 are provided such that the head axis O2 is interposed therebetween. The depressing parts 151 protrude toward the outside of the molding part 114 through through-holes 152 that pass through the molding part 114 in the radial direction. In the present embodiment, the outer tube part 121 of the base part 113 is formed in the double tubular shape having the annular groove that is open to the upside, and the lower end of the molding part 114 is fitted into the annular groove.

A biasing member 153 is provided between the discharge container 111 and the mounting part 115. The biasing member 153 upwardly biases the mounting part 115 located at the discharge position to raise it up to the standby position.

The biasing member 153 is provided between the pot main body 130 and the base part 113, and is installed between the discharge container 111 and the mounting part 115 via the base part 113. An upper end of the biasing member 153 is in contact with a lower surface of the pot main body 130, and a lower end of the biasing member 153 is in contact with an upper surface of a flange 154 that protrudes from the inner tube part 122 of the base part 113.

In the present embodiment, the core 125 is formed in the same diameter over the full length in the vertical direction.

The base part 113, the molding part 114, and the mounting part 115 constitute the molding head 144 that is mounted on the discharge container 111 and lowers the stem 119 to discharge the content. The molding head 144 molds the content discharged from the stem 119 provided vertically with the discharge container 111 into a shape different from a case in which the content is simply discharged from the stem 119, and molds a molding having a three-dimensional shape. In the present embodiment, the molding head 144 molds a double flower such as a rose as the molding.

Next, an operation of the molding head 144 according to the present embodiment will be described.

Figure 14:
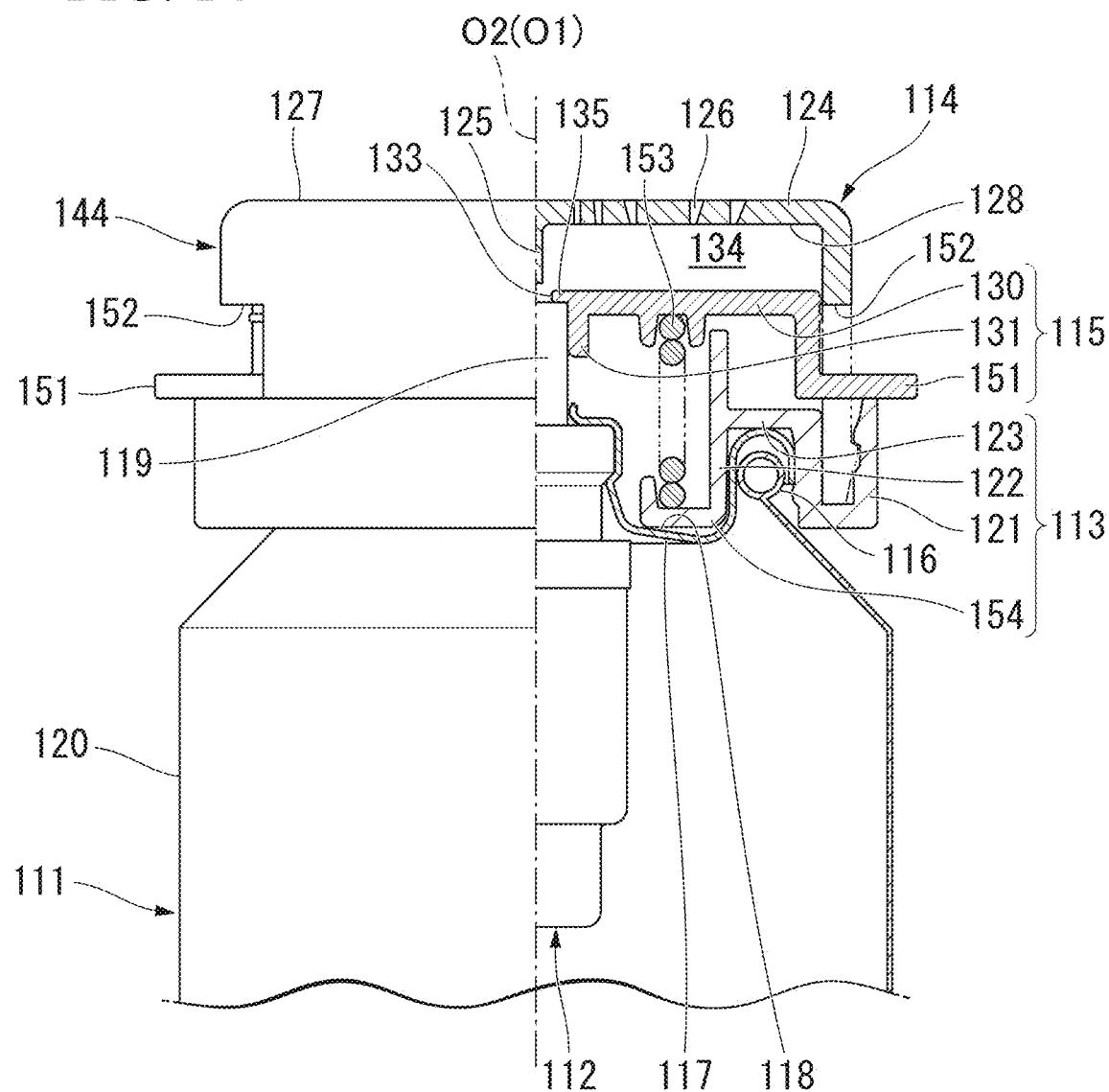
FIG. 14 is a longitudinal half sectional view of the molding head illustrated in FIG. 11, and is view illustrating a state in which the mounting part is located at a descent end.

When the mounting part 115 discharges a content from a state in which it is disposed at the standby position illustrated in FIG. 11, the depressing parts 151 of the mounting part 115 is depressed against an upward biasing force of the biasing member 153 and, as illustrated in FIG. 13, the mounting part 115 is lowered up to the discharge position. Afterwards, when the mounting part 115 is again lowered against the upward biasing forces of the biasing member 153 and the stem 119, the locking part 135 lowers the stem 119, and the content inside the discharge container 111 is fed from the stem 119 to the diffusion chamber 134. As illustrated in FIG. 14, when the mounting part 115 is lowered up to a descent end, the depressing parts 151 collides with the outer tube part 121 of the base part 113, and additional downward movement of the mounting part 115 is restrained. Afterwards, when the depression of the depressing parts 151 is released, the mounting part 115 is raised by the upward biasing forces of the stem 119 and the biasing member 153, and is restored and displaced up to the standby position.

As described above, according to the molding head 144 of the present embodiment, since the biasing member 153 is provided between the discharge container 111 and the mounting part 115, the mounting part 115 located at the discharge position can be raised up to the standby position on the basis of the upward biasing force of the biasing member 153. Thereby, it is possible to handleability of the molding head 144. In the illustrated example, the biasing member 153 is formed by a coil spring. In place of the coil spring, an elastic body, such as a leaf spring, which is different from the coil spring may be adopted. At this point, for example, a cost of the molding head 144 can also be reduced by adopting the low-cost biasing member 153.

The content discharged from the stem 119 is fed to the diffusion chamber 134 through the communication hole 133. This content is discharged upwards from the communication hole 133, is fed to the core 125, flows on an outer circumferential surface of the core 125 in the vertical direction, and is held in the core 125. At this point, the content is held in the core 125 to have a circular shape centered on the core 125, for example, in a top view. With an increase in an amount of discharge of the content from the stem 119, when an amount of feed to the core 125 is increased, the content grows on the core 125, and is gradually expanded toward the outside in the radial direction. Thereby, as described above, the diffusion chamber 134 is formed in the flat shape, and the content fed into the diffusion chamber 134 is diffused in the radial direction, and is fed from the feeding surface 128 to the plurality of forming holes 126. When the content is molded by separately passing through the plurality of forming holes 126, the plurality of molded pieces are formed. These molded pieces are combined on the molding surface 127, and thereby the molding is formed. The molded pieces molded by the forming holes 126 are formed to be long in a direction in which the forming holes 126 extend.

The content inside the discharge container 111 is diffused in the diffusion chamber 134 in the radial direction, and then is fed to the forming holes 126. For this reason, the content is inhibited from being concentrated on the forming holes 126 disposed at a specific portion of the molding surface 127, and the content can be fed to the forming holes 126 such that a variation in an amount of feed of the discharge (or the content) to the forming holes is reduced. Thereby, a variation in an amount of discharge of the content discharged to the molding surface 127 can be suppressed at each position.

As in the present embodiment, the plurality of forming holes 126 are formed, and the molding part 114 forms the molding by combining the plurality of molded pieces, which are formed by the content molded by separately passing through the plurality of forming holes 126, on the molding surface 127. In this case, as described above, the content can be fed to the forming holes 126 such that the variation in the amount of feed of the content to each of the forming holes is reduced, and thereby the molded pieces formed by the forming holes 26 can be formed accurately. For this reason, the molding can be formed with high accuracy.

The mounting part 115 is restored and displaced at the standby position, and thereby the content remaining in the diffusion chamber 134 can be extruded from the diffusion chamber 134. For this reason, a remaining amount of the content inside the molding part 114 can be reduced. In this way, the remaining amount of the content inside the molding part 114 is reduced and thereby, for example, the inside of the molding part 114 can also be easy to cleanly maintain.

The mounting part 115 is provided with the pot main body 130. Thereby, the content inside the diffusion chamber 134 can be inhibited from leaking through a space between the outer periphery of the pot main body 130 and the inner circumferential surface of the molding part 114 without intention. Moreover, since the locking part 135 is formed by the open periphery of the communication hole 133 at the pot main body 130, a structure of the mounting part 115 can be simplified. Since the mounting part 115 is provided with the guide tube 131, the mounting part 115 can be guided in the vertical direction by the stem 119 and the guide tube 131, and the handleability of the molding head 144 can be improved.

The technical scope of the present invention is not limited to the third embodiment, and can be variously modified without departing from the scope of the present invention.

As the molding, a letter or a logotype may be molded. Further, in the third embodiment, the molding is formed on the molding surface 127, but the present invention is not limited thereto. For example, without forming the molding on the molding surface 127, the content may be simply discharged. For example, depending on the shape of the molding molded by the molding head 144 or the use of the content to be discharged, the number or shapes of the forming holes can be appropriately changed. For example, the number of forming hole may be one.

In the third embodiment, as the discharge container 111, the aerosol can is adopted, but the present invention is not limited thereto. For example, as the discharge container 111, a constitution in which the discharger 112 having the pump mechanism is provided can also be adopted.

(Fourth Embodiment)

Hereinafter, a molding head according to a fourth embodiment of the present invention will be described with reference to FIGS. 15 to 18.

As illustrated in FIGS. 15 to 18, a molding head 244 is provided with a molding part 215 and a mounting part 261, and is mounted on a discharge container 212. The discharge container 212 discharges a content capable of maintaining a shape at least for a certain time after, for example, a foam or a high-viscosity material is discharged.

In the present embodiment, all the center axes of a mouth 212a, a base 220, and a bottom (not shown) of the discharge container 212 are disposed on a common container axis O1. The mounting part 261 is formed in a topped tubular shape, and the molding part 215 is formed in a topped tubular shape. All the center axes of the mounting part 261 and the molding part 215 are disposed on a common axis. Hereinafter, the common axis is referred to as a head axis O2. The head axis O2 is located on the container axis O1. In a direction along the head axis O2, the discharge container 212 side is referred to as a lower side (a downside), and the opposite side of the discharge container 212 side is referred to as an upper side (an upside). The direction along the head axis O2 is referred to as an upward/downward direction (a vertical direction). In a top view of the molding head 244, a direction perpendicular to the head axis O2 is referred to as a radial direction, and a direction circling around the head axis O2 is referred to as a circumferential direction.

The mouth 12a of this discharge container 212 is covered with a top wall 217, and thereby the discharge container 212 is sealed. The top wall 217 is provided with an annular concavity 218 that extends in the circumferential direction. The annular concavity 218 is recessed downwards.

A discharger 214 is provided with a stem 219 that is vertically provided for the mouth 12a of the discharge container 212 to be movable down in an upward biased state. The stem 219 is disposed coaxially with the head axis O2, and is formed in a smaller diameter than the annular concavity 218. The stem 219 passes through the top wall 217 in the vertical direction. A discharge valve (not shown) is provided in the discharger 214 at a portion located inside the discharge container 212.

When the stem 219 is depressed with respect to the discharge container 212, the discharge valve is opened, and a content inside the discharge container 212 is discharged from an upper end of the stem 219 through the inside of the stem 219. At this point, in the present embodiment, the internal content of the discharge container 212 which is formed, for example, in a foam shape is discharged from the upper end of the stem 219. When the depression of the stem 219 is released, the stem 219 is raised by an upward biasing force acting on the stem 219, and the discharge valve is closed, so that the discharging of the content is stopped. The discharge container 212 and the discharger 214 discharge the content contained in the discharge container 212 from the stem 219. In the illustrated example, as the discharge container 212, an aerosol can in which a liquid content is contained is adopted.

The base part 213 is fixed to the mouth 12a of the discharge container 212 to surround the stem 219 from an outside in the radial direction. The base part 213 is formed in a multiple tubular shape that is coaxial with the head axis O2. The base part 213 is fixed to the mouth 12a of the discharge container 212 to disable rotation around the head axis O2 and upward movement. The base part 213 is provided with an outer tube part 221, an inner tube part 222, and a protrusion 223A.

In the present embodiment, the outer tube part 221 is formed in a double tubular shape having an annular groove that is open toward the upside, and a lower end of a circumferential wall 215a of the molding part 215 is fitted into the annular groove. A top-view shape of the outer tube part 221 has a circle shape that is coaxial with the head axis O2.

The inner tube part 222 is fitted into the annular concavity 218 of the top wall 217. The inner tube part 222 is fitted into an outer circumferential surface of the annular concavity 218, which faces an inside in the radial direction, from the inside in the radial direction. The protrusion 223A connects the outer tube part 221 and the inner tube part 222, and protrudes toward the upside. In a discharged state (to be described below), an outer circumferential surface of the protrusion 223A and an inner circumferential surface of a pot main body 230 are disposed at positions at which they are close to each other in the radial direction.

The molding part 215 has a top wall 224 disposed above the stem 219. The top wall 224 is formed in a plate shape perpendicular to the head axis O2. A top-view shape of an inner circumferential surface of the molding part 215 has a circular shape that is coaxial with the head axis O2. The molding part 215 is formed in a topped cylindrical shape disposed coaxially with the head axis O2. A core 225, forming holes 226A, and an insertion hole 229 are formed in the molding part 215. The core 225 extends downwards from the top wall 224. The core 225 is disposed coaxially with the head axis O2. The core 225 is located above an edge of the upper end of the stem 219. An outer diameter of the core 225 is smaller than an inner diameter of the stem 219, and the core 225 faces the upper end of the stem 219 in the vertical direction. The core 225 is formed in a solid rod or post shape. A reduced diameter part is formed at a lower end of the core 225.

The plurality of forming holes 226A are formed by passing through the top wall 224 of the molding part 215 in the vertical direction. The plurality of forming holes 226A are separately open to a molding surface 227 that is directed upwards at the top wall 224, and a feeding surface 228 that is directed downwards at the top wall 224. The molding surface 227 and the feeding surface 228 extend in a direction perpendicular to the head axis O2.

The forming holes 226A are formed in an elongate hole shape extending in the circumferential direction. The plurality of forming holes 226A are disposed in the circumferential and radial directions at intervals. In the present embodiment, the plurality of forming holes 226A disposed in the circumferential direction at intervals form hole rows L1, and these hole rows L1 are multiply arranged round the head axis O2. The hole rows L1 are disposed to surround the core 225 from the outside in the radial direction in a top view.

The insertion hole 229 is formed by cutting out a circumferential wall 215a of the molding part 215 such that a lower end side of the circumferential wall 215a is open, and passes through the molding part 215 in the radial direction. The insertion hole 229 is provided at an insertable position and dimension such that depressing parts 271 (to be described below) of the mounting part 261 protrude toward an outside of the molding part 215.

The mounting part 261 is provided inside the molding part 215 to be movable up and down, and rotational movement thereof relative to the molding part 215 is restrained. The mounting part 261 is provided with the pot main body 230 disposed inside the molding part 215, a guide tube 231, on the inside of which the stem 219 advances or retreats, a locking part 236 that is locked to the stem 219 and lowers the stem 219 along with downward movement of the mounting part 261, and the depressing parts 271 that protrude toward the outside in the radial direction. The pot main body 230 is formed in a topped tubular shape, and is fitted into the molding part 215 to be movable up and down. An outer circumferential surface of the pot main body 230 slides on an inner circumferential surface of the molding part 215 in the vertical direction. A top-view shape of the pot main body 230 has the same shape and size as the top-view shape of the inner circumferential surface of the molding part 215.

A communication hole 234 is formed in the pot main body 230. The communication hole 234 passes through the pot main body 230 in the vertical direction. The communication hole 234 is disposed coaxially with the head axis O2. The communication hole 234 has a larger diameter than the core 225, and the core 225 is inserted into the communication hole 234. The communication hole 234 has a smaller diameter than an outer diameter of the stem 219.

The guide tube 231 extends downwards from the pot main body 230, and the guide tube 231 is disposed coaxially with the head axis O2.

Figure 15:
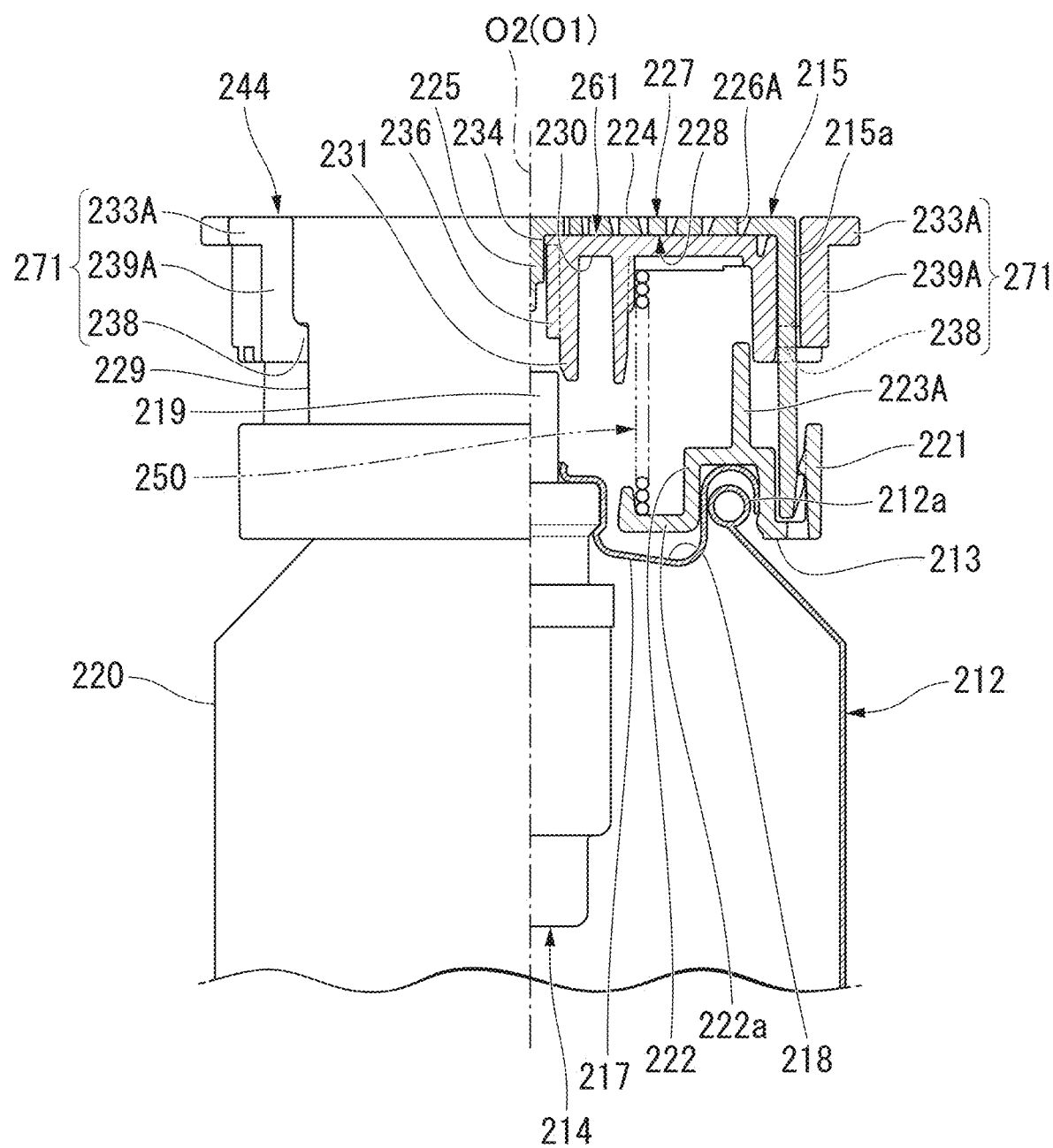
FIG. 15 is a longitudinal half sectional view of a main part of a molding head according to a fourth embodiment of the present invention, and is view illustrating a state in which a mounting part is located at a standby position.
Figure 16:
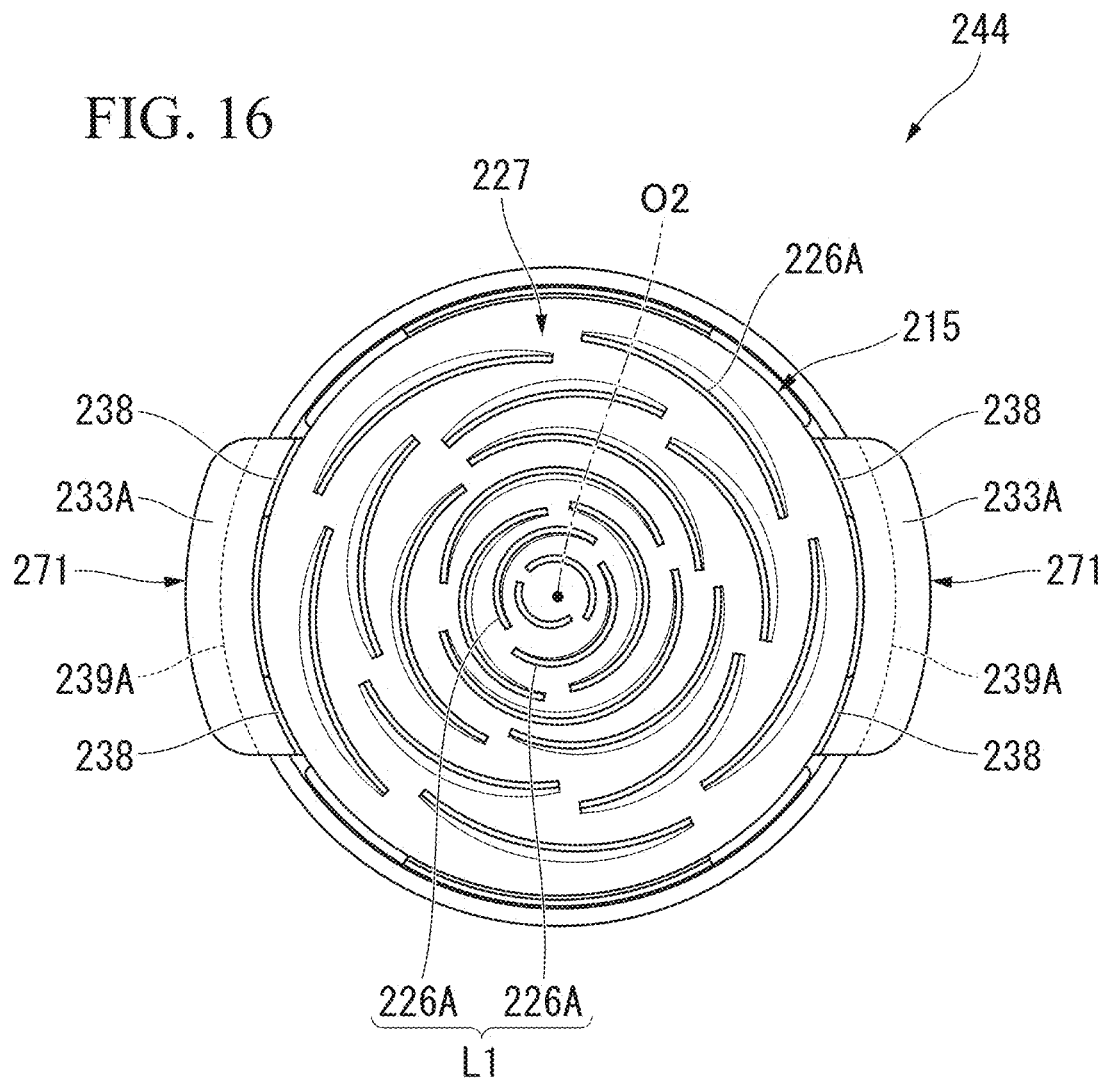
FIG. 16 is a top view of the molding head illustrated in FIG. 15.
Figure 17:
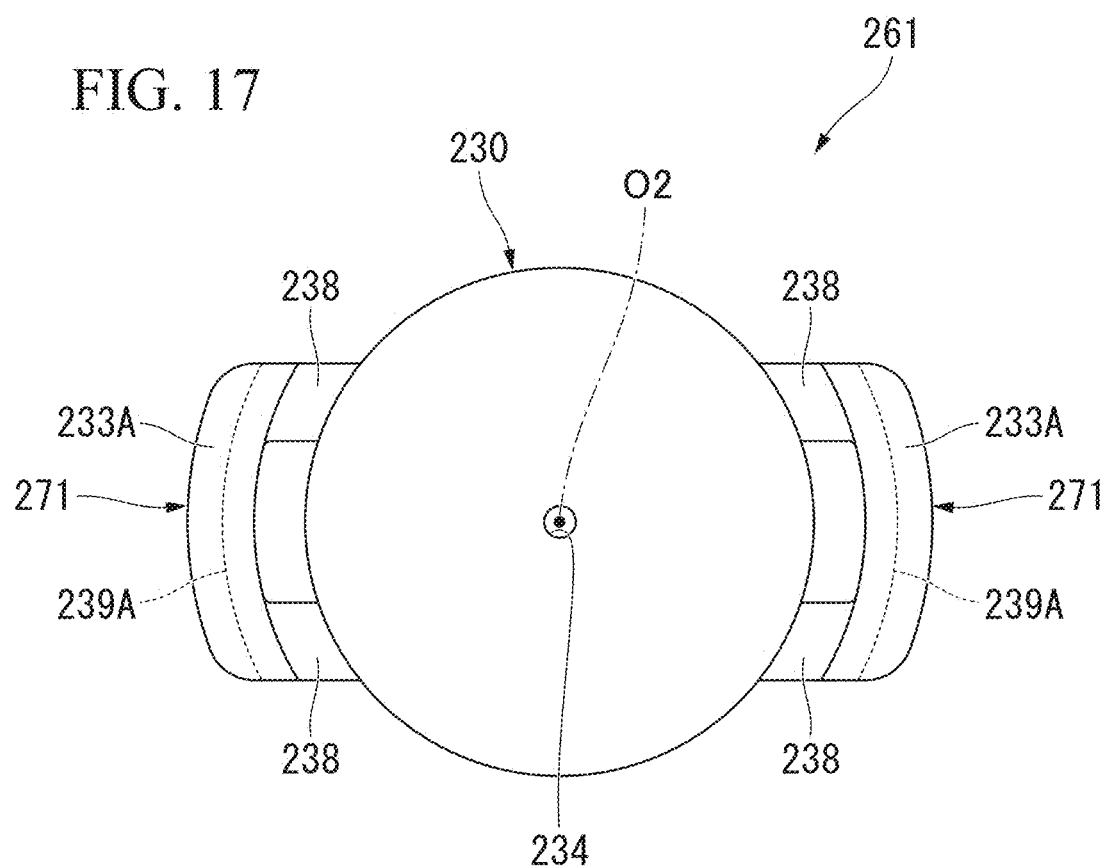
FIG. 17 is a top view illustrating the mounting part of the molding head illustrated in FIG. 16.
Figure 18:
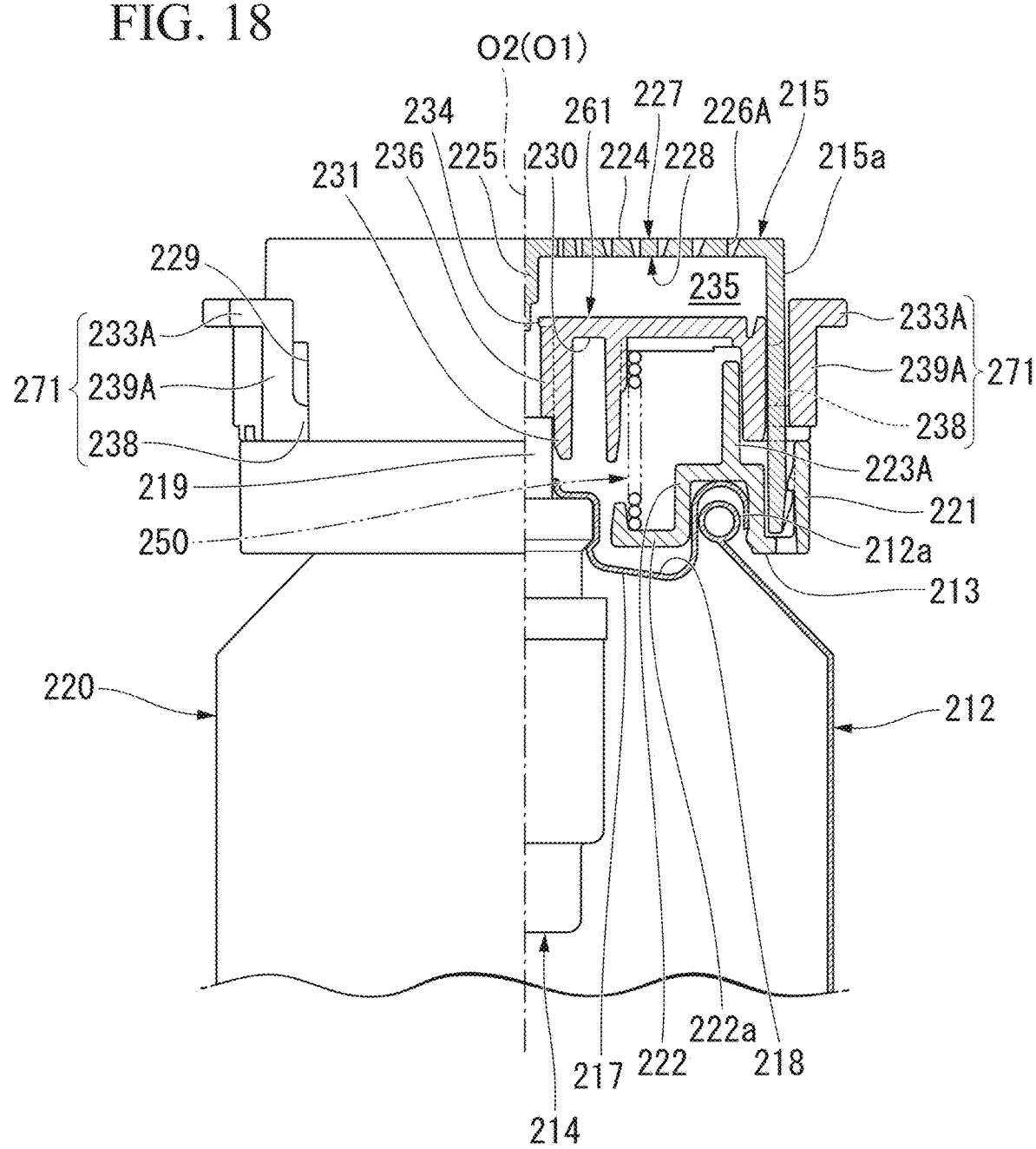
FIG. 18 is a longitudinal half sectional view of a main part of the molding head illustrated in FIG. 15, and is view illustrating a state in which the mounting part is lowered to a discharge position.

The mounting part 261 moves up and down between an upper standby position at which it is in contact with or close to the feeding surface 228 illustrated in FIG. 15 and a lower discharge position at which it lowers the stem 219 illustrated in FIG. 18 and feeds a content from the stem 219 into a diffusion chamber 235. As illustrated in FIG. 15, when the mounting part 261 is located at the standby position, the core 225 is inserted into the communication hole 234.

As illustrated in FIG. 15, the mounting part 261 is separated downwards from the feeding surface 228 at the discharge position, and the diffusion chamber 235 is formed between the mounting part 261 and the feeding surface 228. The diffusion chamber 235 diffuses the content from the stem 219 between the feeding surface 228 that is directed downwards at the top wall 224 and the mounting part 261 in the radial direction (in directions along the molding surface 227 and the feeding surface 228), and feeds the content to the plurality of forming holes 226A. The diffusion chamber 235 is disposed coaxially with the head axis O2. The diffusion chamber 235 is formed in a flat shape that is larger in the radial direction than in the vertical direction. A wall surface of the diffusion chamber 235 is partly defined by the feeding surface 228.

The mounting part 261 is provided with a locking part 236 that is locked to the stem 219 and lowers the stem 219 when the mounting part 261 is located at the discharge position. The locking part 236 is located at the open periphery of the communication hole 234 at the pot main body 230, is in contact with the edge of the upper end of the stem 219, and lowers the stem 219. At this point, the communication hole 234 communicates with the inside of the stem 219 and the diffusion chamber 235. At this point, the pot main body 230 of the mounting part 261 is located below the core 225, and the core 225 is disposed inside the diffusion chamber 235.

As illustrated in FIGS. 15 and 18, the mounting part 261 is provided with the depressing parts 271 that protrude toward the outside in the radial direction. The depressing parts 271 are each provided with a lateral plate 239A whose outer and inner surfaces extend along the outer circumferential surface of the molding part 215, a depressing plate 233A which protrudes from the lateral plate 239A toward the outside in the radial direction and whose top and bottom surfaces are directed in the vertical direction, and connecting plates 238 that connect the lateral plate 239A and the pot main body 230 and are inserted into the insertion hole 229. The depressing parts 271 are arranged on the outside of the molding part 215 in the radial direction through the insertion hole 229 formed in the circumferential wall 215a of the molding part 215.

The two depressing parts 271 are separately disposed on the outer circumferential surface of the pot main body 230 at positions between which the head axis O2 is interposed in the radial direction. The connecting plates 238 protrude from a lower end of the outer circumferential surface of the pot main body 230 toward the outside in the radial direction. The plurality of connecting plates 238 (the two connecting plates 238 in the illustrated example) are disposed in the circumferential direction at an interval. The connecting plates 238 connect the pot main body 230 to the lateral plate 239A in a state in which they are inserted into the insertion hole 229. The lateral plates 239A are arranged to extend in the vertical direction. The outer and inner surfaces of each of the lateral plates 239A extend along the outer circumferential surface of the molding part 215. Each of the lateral plates 239A connects the connecting plates 238 and the depressing plate 233A.

The depressing plates 233A protrude from upper ends of the lateral plates 239A toward the outside in the radial direction. Top and bottom surfaces of each of the depressing plates 233A are directed in the vertical direction. The top surfaces of the depressing plates 233A are flush with the molding surface 227 of the molding part 215. The top surfaces of the depressing plates 233A may not be flush with the molding surface 227.

A biasing member 250 formed of a spring member is provided between the base part 213 and the mounting part 261. The biasing member 250 upwardly biases the mounting part 261 located at the discharge position, and raises the mounting part 261 up to the standby position. An upper end of the biasing member 250 is in contact with a lower surface of the pot main body 230, and a lower end of the biasing member 250 is in contact with an upper surface of a flange 222a that protrudes from the inner tube part 222 of the base part 213 toward the inside in the radial direction.

Next, an operation of the molding head 244 according to the present embodiment will be described.

In an initial state before the molding head 244 is used, the mounting part 261 is disposed at the standby position illustrated in FIG. 15. As illustrated in FIG. 18, when the content is discharged to the molding surface 227 of the molding part 215, the depressing plates 233A are depressed against a biasing force of the biasing member 250. Thereby, an internal volume of the diffusion chamber 235 located between the top wall 224 of the molding part 215 and the mounting part 261 is increased, and the locking part 236 of the mounting part 261 is locked to the upper end of the stem 219.

Further, as the mounting part 261 moves down, the stem 219 locked by the locking part 236 moves down against the upward biasing force. Thereby, the content inside the discharge container 212 flows into the diffusion chamber 235 through the stem 219. After the content flowing into the diffusion chamber 235 is diffused in the diffusion chamber 235 between the feeding surface 228 that is directed downwards at the top wall 224 and the mounting part 261 in the radial direction, the content is fed to the plurality of forming holes 226A, and is discharged from the plurality of forming holes 226A to the molding surface 227.

Here, when the content is molded by separately passing through the plurality of forming holes 226A, a plurality of molded pieces are formed. Further, these molded pieces are combined on the molding surface 227, and thereby a molding is formed. The molded pieces molded by the forming holes 226A are molded in an elongate shape in directions in which the forming holes 226A extend.

Afterwards, when the depression operation of the depressing plates 233A is released, the mounting part 261 moves up relative to the molding part 215 as the stem 219 is restored and displaced upwards. At this point, as the internal volume of the diffusion chamber 235 is reduced, the content flowing into the diffusion chamber 235 is extruded to the outside from the diffusion chamber 235 through the forming holes 226A.

As described above, according to the molding head 244 of the present embodiment, the depressing parts 271 depressed when the content is discharged are provided for the mounting part 261 independently of the molding part 215 having the molding surface 227 to which the content is discharged. For this reason, the content can be discharged without contact with the molding surface 227 of the molding part 215, and the content can be prevented from sticking to hands. The molding part 215 is inhibited from wobbling, and the content can be prevented from overflowing from the molding surface 227.

Further, in the molding head 244 of the present embodiment, the depressing parts 271 are provided with the lateral plates 239A that extend along the outer circumferential surface of the molding part 215, and the depressing plates 233A protruding toward the outside in the radial direction are connected to the connecting plates 238 via the lateral plates 239A. For this reason, bending rigidity of the depressing parts 271 in the vertical direction can be easily secured, and durability can be improved.

Since the content inside the discharge container 212 is diffused in the diffusion chamber 235 in the radial direction and then is fed to the forming holes 226A, the content can be fed to the forming holes 226A such that the content is inhibited from being concentrated on the forming holes 226A disposed at a specific portion of the molding surface 227 and a variation in an amount of feed of the content to each of the forming holes is reduced. Thereby, a variation in an amount of discharge of the content discharged to the molding surface 227 can be inhibited at each position.

Further, in the present embodiment, when the mounting part 261 performs a depression operation in which the depressing plates 233A are depressed downwards from a state in which it is located at the standby position, the mounting part 261 is lowered against the upward biasing force caused by the biasing member 250. Thereby, the internal volume of the diffusion chamber 235 formed between the feeding surface 228 of the molding part 215 and the mounting part 261 is increased, and the locking part 236 of the mounting part 261 is locked to the stem 219. Further, when the mounting part 261 performing the depression operation is lowered, the locking part 236 lowers the stem 219 against the upward biasing force along with the downward movement of the mounting part 261. Thereby, the mounting part 261 is disposed at the discharge position, the content inside the discharge container 212 flows into the diffusion chamber 235 through the stem 219.

Afterwards, when the depression operation of the depressing plates 233A is released, the mounting part 261 and the stem 219 moves up and are restored and displaced by the upward biasing force of the mounting part 261 caused by the biasing member 250 and the upward biasing force of the stem 219, and the mounting part 261 returns to the standby position. At this point, since the mounting part 261 is in contact with or close to the top wall 224 of the molding part 215, although the content remains in the diffusion chamber 235 before the mounting part 261 is raised, this content is extruded from the diffusion chamber 235 to the molding surface 227. That is, the depression operation of the depressing plates 233A is released, and thereby the mounting part 261 is restored and displaced to an upper initial position. Thereby, since the content remaining in the diffusion chamber 235 can be extruded from the diffusion chamber 235, an remaining amount of the content in the molding part 215 can be reduced. In this way, the remaining amount of the content in the molding part 215 is reduced and thereby, for example, the inside of the molding part 215 can also be easy to cleanly maintain.

The technical scope of the present invention is not limited to the fourth embodiment, and can be variously modified without departing from the scope of the present invention.

For example, in the fourth embodiment, the constitution in which the two depressing parts 271 are arranged on the pot main body 230 and the two connecting plates 238 are disposed at one of the depressing plates 233A is presented, but the present invention is not limited to this aspect. For example, one or three or more depressing parts may be arranged on the pot main body, one or three or more connecting plates may be disposed at one of the depressing plates. In the fourth embodiment, the constitution in which the diffusion chamber 235 is formed when the mounting part 261 is located at the discharge position is presented, but the present invention is not limited to this aspect. For example, regardless of whether the mounting part 261 is located at the standby position or at the discharge position, the diffusion chamber may be formed at all times or may not be present. As the discharge valve of the discharger 214, a metering valve in which a constant amount of content is discharged by one push-in operation of the stem 219 may be adopted. In this case, when the content is discharged to the molding surface 227, the molding formed on the molding surface 227 via the plurality of forming holes 226A by a combination can be formed accurately.

(Verification Test)

Next, a verification test of the operation and effects described above will be described. In the verification test, a total of four molding heads of Embodiment 1 and Comparative Examples 1 to 3 were prepared. As Embodiment 1, a molding head configured to correspond to the molding head 20 represented in the first embodiment was adopted. The height of the diffusion chamber was set to 4 mm, and the widths of the lower end openings of the forming elongate holes located on the innermost side in the radial direction among the plurality of forming elongate holes were set to 0.4 mm. As Comparative Example 1, with respect to the molding head of Embodiment 1, a molding head in which the height of the diffusion chamber was made different and was set to 1 mm was adopted. As Comparative Example 2, with respect to the molding head of Embodiment 1, a constitution in which the widths of the lower end openings of the forming elongate holes located on the innermost side in the radial direction among the plurality of forming elongate holes were made different and were set to 2 mm or more was adopted. As Comparative Example 3, with respect to the molding head of Embodiment 1, a constitution in which the radial interval between the forming elongate holes 53 adjacent to each other in the radial direction was made different and was set to 5 mm or more was adopted.

The formation of the molding on the molding surface by passing the discharge M through the forming holes of each of the molding heads of Embodiment 1 and Comparative Examples 1 to 3 was tested. Afterwards, the discharge M on the molding surface of each of the molding heads was photographed. The results are shown in FIGS. 19 to 23.

Figure 19:
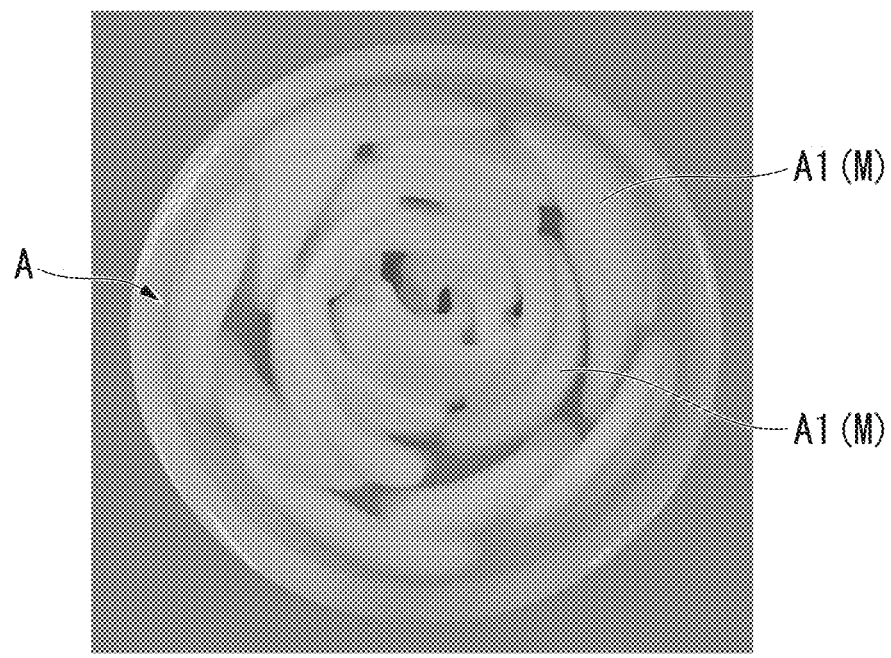
FIG. 19 is a photograph (in a top view) of a test result according to a molding head of Embodiment 1 in a verification test.
Figure 20:
FIG. 20 is a photograph (in a perspective view) of the test result according to the molding head of Embodiment 1 in the verification test.
Figure 21:
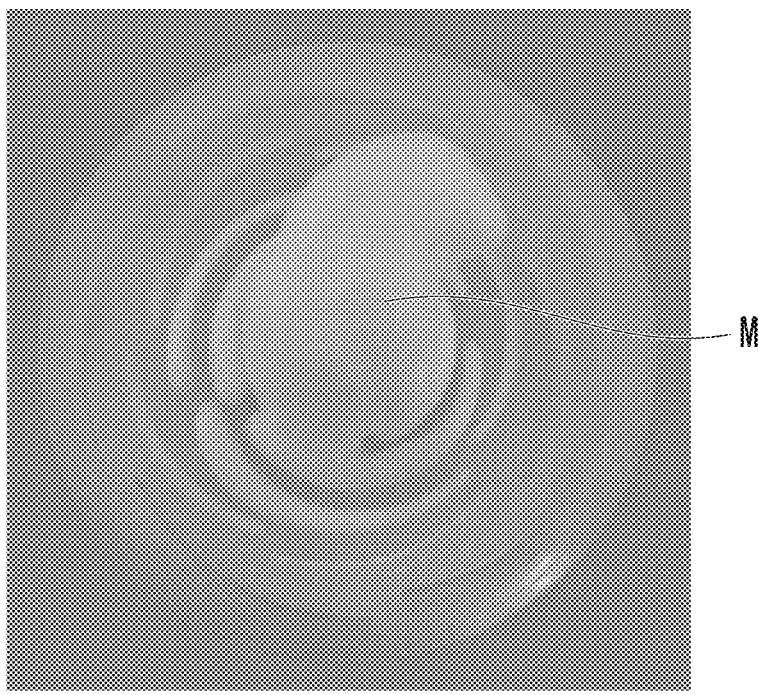
FIG. 21 is a photograph (in a top view) of a test result according to a molding head of Comparative Example 1 in the verification test.
Figure 22:
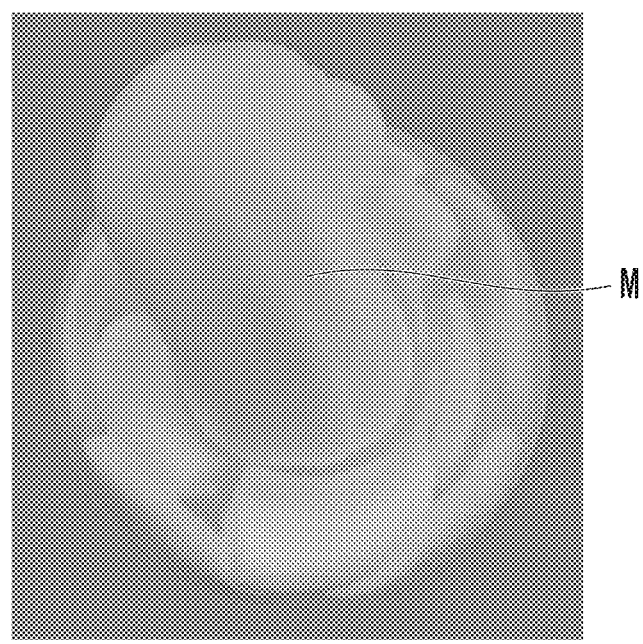
FIG. 22 is a photograph (in a top view) of a test result according to a molding head of Comparative Example 2 in the verification test.
Figure 23:
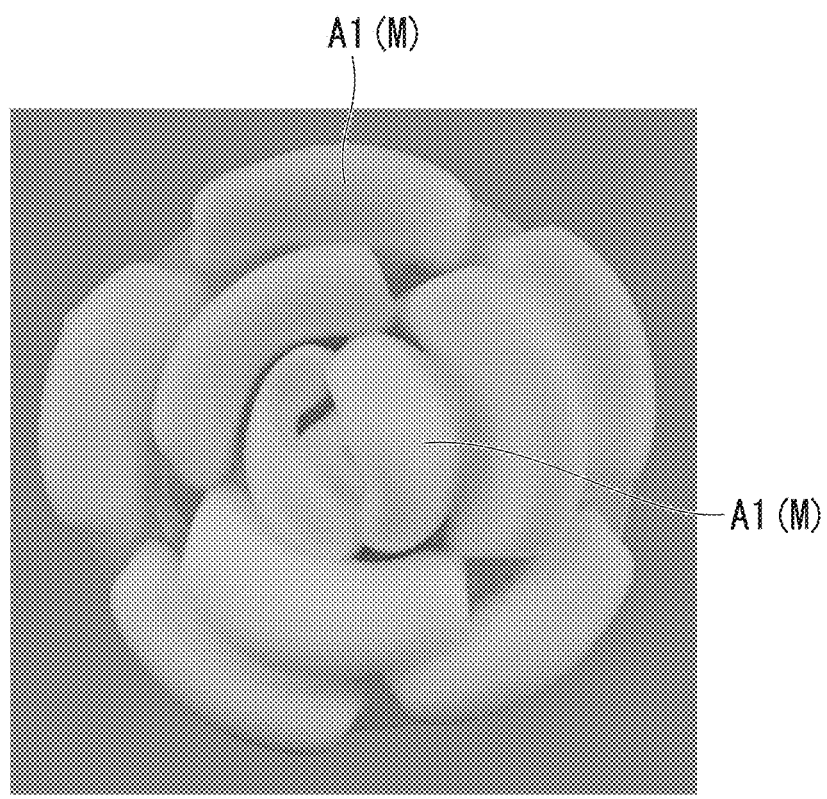
FIG. 23 is a photograph (in a top view) of a test result according to a molding head of Comparative Example 3 in the verification test.

In Embodiment 1, as illustrated in FIGS. 19 and 20, it was confirmed that the molding A was accurately formed. In Comparative Examples 1 and 2, as illustrated in FIGS. 21 and 22 respectively, it was confirmed that the discharge M was excessively concentrated in the center on the molding surface in a radial direction. In Comparative Example 3, as illustrated in FIG. 23, it was confirmed that the molded pieces A1 were excessively separated from each other on the molding surface in a radial direction.

In addition, in the same verification tests as the above verification test, also when each of molding heads configured to correspond to the molding heads 20, 60, 144, 244 represented in the second embodiment to the fourth embodiment was adopted as another embodiment, the same verification result as the above Embodiment 1 was confirmed, and that is, it was confirmed that the molding A was accurately formed as illustrated in FIGS. 19 and 20. In other words, it was confirmed that, in any molding head of the molding heads 20, 60 of the first and second embodiments in which the diffusion chamber 50 is always provided between the mounting part 21 and the molding part 23, and the molding heads 144 of the third and fourth embodiments in which the diffusion chambers 134, 244 are configured to be provided between the mounting parts 115, 261 and the molding parts 114, 215 when the mounting parts 115, 261 are located at any positions from the standby position to at the discharge position except the standby position, the molding A was accurately formed.

In addition, without departing the scope of the present invention, the components in the all embodiment can be appropriately replaced with well-known components. All the aforementioned modification may be appropriately combined.

What is claimed is:

1. A molding head for being attached to a discharge container including a mouth in which a stem is erected to be movable down in an upwardly biased state, the molding head comprising:
   a mounting part formed in a cylindrical shape with a bottom, mounted on an upper end of the stem, and provided with a communication hole communicating with a discharge hole of the stem, the discharge hole from which an internal content in the discharge container is discharged as discharge; and
   a molding part formed in a cylindrical shape with a top and provided with a plurality of forming holes and a molding surface to which the plurality of forming holes are open, the plurality of forming holes through which the discharge discharged from the discharge hole through the communication hole separately passes, and the molding part configured to combine a plurality of molded pieces, which are formed by the discharge molded by separately passing through the plurality of forming holes, on the molding surface to form a molding,
   wherein
   one of the mounting part and the molding part is fitted into the other one of the mounting part and the molding part, and
   an inner space formed between the mounting part and the molding part thereby forms a diffusion chamber, the diffusion chamber in which the discharge discharged from the discharge hole through the communication hole is diffused in a radial direction along the molding surface and from which the discharge discharged from the discharge hole through the communication hole is fed to the plurality of forming holes.

2. A molding head for being attached to a discharge container including a mouth in which a stem is erected to be movable down in an upwardly biased state, the molding head comprising:
  a mounting part formed in a cylindrical shape with a top, configured to be mounted on an upper end of the stem, and provided with a communication hole configured to communicate with a discharge hole of the stem, the discharge hole from which an internal content in the discharge container is discharged as discharge; and
  a molding part formed in a cylindrical shape with a top and provided with a plurality of forming holes and a molding surface to which the plurality of forming holes are open, the plurality of forming holes through which the discharge discharged from the discharge hole through the communication hole separately passes, and the molding part configured to combine a plurality of molded pieces, which are formed by the discharge molded by separately passing through the plurality of forming holes, on the molding surface to form a molding,
  wherein
  the mounting part is fitted into the molding part, and
  an inner space configured to be formed between the mounting part and the molding part thereby forms a diffusion chamber, the diffusion chamber in which the discharge discharged from the discharge hole through the communication hole is diffused in a radial direction along the molding surface and from which the discharge discharged from the discharge hole through the communication hole is fed to the plurality of forming holes,
  the molding part has a main body part which is disposed above the stem and through which the forming holes pass in a vertical direction;
  the mounting part is provided, between an upper standby position at which the mounting part is in contact with or close to a feeding surface that is directed downwards at the main body part and a lower discharge position at which the mounting part is separated downwards from the feeding surface and the diffusion chamber is formed between the mounting part and the molding part, to be movable up and down in the molding part; and
  the mounting part is provided with a locking part that is locked to the stem when located at the discharge position and lowers the stem along with downward movement of the mounting part.

3. The molding head according to claim 1, wherein:
  the mounting part is mounted around the discharge hole via the stem.

4. The molding head according to claim 1, wherein:
  the molding part has a main body part which is disposed above the stem and through which the forming holes pass in a vertical direction;
  the mounting part is fitted into the molding part;
  the mounting part is movably provided inside the molding part;
  the molding part is mounted on the discharge container;
  the mounting part is provided with a locking part that is locked to the stem and lowers the stem along with downward movement of the mounting part, and depressing parts that protrude toward an outside in the radial direction; and
  the depressing parts are arranged outside the molding part via an insertion hole formed in a circumferential wall of the molding part.

5. The molding head according to claim 4, wherein:
  the mounting part is provided with a pot main body disposed in the molding part; and
  the depressing parts are each provided with a lateral plate whose inner and outer surfaces extend along an outer circumferential surface of the molding part, a depressing plate which protrudes from the lateral plate toward the outside in the radial direction and whose top and bottom surfaces are directed in a vertical direction, and a connecting plate that connects the lateral plate and the pot main body and is inserted into the insertion hole.

6. The molding head according to claim 3, wherein the mounting part is mounted on the stem to be rotatable around an axis of the stem and is lowered along with rotational movement relative to the stem.

7. The molding head according to claim 6, further comprising a conversion mechanism configured to convert the rotational movement of the mounting part relative to the stem into downward movement of the mounting part relative to the mouth,
  wherein the conversion mechanism alternately repeats a descent state in which the mounting part is lowered against an upward biasing force of the stem and an ascent state in which the mounting part is raised by the biasing force of the stem when the mounting part is rotated around the axis in the same direction.

8. The molding head according to claim 1, wherein the diffusion chamber is provided with a restraint member facing the discharge hole.

9. The molding head according to claim 1, wherein:
  at least some of the plurality of forming holes serve as forming elongate holes formed in an elongate hole shape; and
  oblique elongate holes, in which one of a pair of sidewall surfaces extending in a direction in which each of the forming elongate holes extends in wall surfaces defining the forming elongate holes is inclined to be separated from the other sidewall surface as the one approaches the molding surface, are provided as the forming elongate holes.

10. The molding head according to claim 1, wherein a dimension of the diffusion chamber in a direction along a head axis perpendicular to the molding surface is equal to or greater than 1.5 mm.

11. The molding head according to claim 1, wherein:
  at least some of the plurality of forming holes serve as forming elongate holes formed in an elongate hole shape; and
  the plurality of forming elongate holes are disposed in the radial direction at intervals.

12. The molding head according to claim 11, wherein widths of lower end openings of the forming elongate holes located on an innermost side in the radial direction among the plurality of forming elongate holes are less than 2 mm.

13. The molding head according to claim 11, wherein a radial interval between the forming elongate holes adjacent to each other in the radial direction is less than 5 mm.

14. The molding head according to claim 9, wherein the forming elongate holes extend in a circumferential direction that circles around a head axis perpendicular to the molding surface.

15. The molding head according to claim 14, wherein the plurality of forming elongate holes are disposed in the circumferential direction at intervals.

16. The molding head according to claim 14, wherein:
as the oblique elongate holes, outer oblique elongate holes, in each of which one of the pair of sidewall surfaces located on the outside in the radial direction is inclined, are provided; and
some of the plurality of forming elongate holes which are located on the outermost side in the radial direction are the outer oblique elongate holes.

17. The molding head according to claim 2, wherein a biasing member that upwardly biases the mounting part located at the discharge position and raises the mounting part up to the standby position is provided between the discharge container and the mounting part.

18. The molding head according to claim 2, wherein the mounting part is provided with a pot main body which is fitted into the molding part and whose outer periphery slides on an inner circumferential surface of the molding part in a vertical direction.

19. The molding head according to claim 18, wherein:
the pot main body is formed with the communication hole that communicates with an inside of the stem and the diffusion chamber when the mounting part is located at the discharge position; and
the locking part is formed by an open periphery of the communication hole at the pot main body.

20. The molding head according to claim 18, wherein the mounting part is provided with a guide tube that extends downwards from the pot main body and is inserted into the stem.

21. The molding head according to claim 2, wherein:
the mounting part is mounted around the discharge hole via the stem.

22. The molding head according to claim 2, wherein:
the molding part is mounted on the discharge container;
the mounting part is provided with depressing parts that protrude toward an outside in the radial direction; and
the depressing parts are arranged outside the molding part via an insertion hole formed in a circumferential wall of the molding part.

23. The molding head according to claim 22, wherein:
the mounting part is provided with a pot main body disposed in the molding part; and
the depressing parts are each provided with a lateral plate whose inner and outer surfaces extend along an outer circumferential surface of the molding part, a depressing plate which protrudes from the lateral plate toward the outside in the radial direction and whose top and bottom surfaces are directed in a vertical direction, and a connecting plate that connects the lateral plate and the pot main body and is inserted into the insertion hole.

24. The molding head according to claim 21, wherein the mounting part is mounted on the stem to be rotatable around an axis of the stem and is lowered along with rotational movement relative to the stem.

25. The molding head according to claim 24, further comprising a conversion mechanism configured to convert the rotational movement of the mounting part relative to the stem into downward movement of the mounting part relative to the mouth,
wherein the conversion mechanism alternately repeats a descent state in which the mounting part is lowered against an upward biasing force of the stem and an ascent state in which the mounting part is raised by the biasing force of the stem when the mounting part is rotated around the axis in the same direction.

26. The molding head according to claim 2, wherein the diffusion chamber is provided with a restraint member facing the discharge hole.

27. The molding head according to claim 2, wherein:
at least some of the plurality of forming holes serve as forming elongate holes formed in an elongate hole shape; and
oblique elongate holes, in each of which one of a pair of sidewall surfaces extending in a direction in which each of the forming elongate holes extends in wall surfaces defining the forming elongate holes is inclined to be separated from the other sidewall surface as the one approaches the molding surface, are provided as the forming elongate holes.

28. The molding head according to claim 2, wherein a dimension of the diffusion chamber in a direction along a head axis perpendicular to the molding surface is equal to or greater than 1.5 mm.

29. The molding head according to claim 2, wherein:
at least some of the plurality of forming holes serve as forming elongate holes formed in an elongate hole shape; and
the plurality of forming elongate holes are disposed in the radial direction at intervals.

30. The molding head according to claim 29, wherein widths of lower end openings of the forming elongate holes located on an innermost side in the radial direction among the plurality of forming elongate holes are less than 2 mm.

31. The molding head according to claim 29, wherein a radial interval between the forming elongate holes adjacent to each other in the radial direction is less than 5 mm.

32. The molding head according to claim 27, wherein the forming elongate holes extend in a circumferential direction that circles around a head axis perpendicular to the molding surface.

33. The molding head according to claim 32, wherein the plurality of forming elongate holes are disposed in the circumferential direction at intervals.

34. The molding head according to claim 32, wherein:
as the oblique elongate holes, outer oblique elongate holes, in each of which one of the pair of sidewall surfaces located on the outside in the radial direction is inclined, are provided; and
some of the plurality of forming elongate holes which are located on the outermost side in the radial direction are the outer oblique elongate holes.

35. The molding head according to claim 1, wherein:
the molding part includes a main body part formed in a plate shape perpendicular to a head axis which is a common axis on which a center axis of the mounting part and a center axis of the molding part are located, and
a whole surface of the molding surface directed upwards at the main body part is formed in a plan surface extending in the radial direction perpendicular to the head axis.

36. The molding head according to claim 9, wherein:
the other sidewall surface extends parallel to a head axis that is a common axis on which a center axis of the mounting part and a center axis of the molding part are located.

37. The molding head according to claim 2, wherein:
the molding part includes the main body part formed in a plate shape perpendicular to a head axis which is a common axis on which a center axis of the mounting part and a center axis of the molding part are located, and a whole surface of the molding surface directed upwards at the main body part is formed in a plan surface extending in the radial direction perpendicular to the head axis.

38. The molding head according to claim 27, wherein:

the other sidewall surface extends parallel to a head axis that is a common axis on which a center axis of the mounting part and a center axis of the molding part are located.

* * * * *